United States Patent
Omori et al.

(10) Patent No.: US 7,594,240 B2
(45) Date of Patent: Sep. 22, 2009

(54) DISK DRIVE APPARATUS

(75) Inventors: Kiyoshi Omori, Tokyo (JP); Yuji Suzuki, Kanagawa (JP); Takashi Ootsuka, Kanagawa (JP); Keiji Jitsukawa, Chiba (JP); Satoshi Muto, Chiba (JP); Koji Natsubori, Chiba (JP); Hidekuni Aizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 11/402,724

(22) Filed: Apr. 12, 2006

(65) Prior Publication Data

US 2006/0184953 A1   Aug. 17, 2006

Related U.S. Application Data

(63) Continuation-in-part of application No. PCT/JP2005/014765, filed on Aug. 11, 2005.

(30) Foreign Application Priority Data

Aug. 12, 2004 (JP) ............................. 2004-235621
Sep. 22, 2004 (JP) ............................. 2004-276028

(51) Int. Cl.
*G11B 17/04* (2006.01)
(52) U.S. Cl. .................................................... 720/620
(58) Field of Classification Search ................. 720/620, 720/619, 629, 646, 647, 648, 655
See application file for complete search history.

(56) References Cited

U.S. PATENT DOCUMENTS 5,355,358 A * 10/1994 Van Alfen .................... 720/647
6,411,583 B1 * 6/2002 Yamamoto et al. ........... 720/647

(Continued)

FOREIGN PATENT DOCUMENTS

JP   06-043899   6/1994

(Continued)

*Primary Examiner*—Tianjie Chen
(74) *Attorney, Agent, or Firm*—Wolf, Greenfield & Sacks, P.C.

(57) ABSTRACT

The present invention is directed to a disk drive apparatus in which an optical disk (2) is detachably loaded, and comprises a casing (3) including a front panel (18) in which a disk insertion/withdrawal hole (19) of which length in length direction is caused to be substantially the same as the diameter of the optical disk, and a biasing member (70) for biasing plural rotational arms (61), (62) for holding the outer circumference of the optical disk therebetween in a predetermined direction in accordance with carrying position of the optical disk, wherein, between the disk insertion/withdrawal position and the disk loading position, there are provided a disk carrying mechanism (60) for performing carrying operation of the optical disk, a disk loading portion (41) to which the optical disk is loaded, a disk rotation drive mechanism (42) for optical disk, an optical pick-up (43) for performing recording and/or reproduction of information signals with respect to the optical disk, and a pick-up feed mechanism (44) for allowing the optical pick-up to undergo feed operation, wherein a slide contact piece (23) caused to be slidably in contact with the outer circumferential surface of the optical disk caused to undergo insertion/withdrawal operation with respect to the disk insertion/withdrawal hole is provided at one end portion in a length direction of the disk insertion/withdrawal hole to limit sudden movement of the optical disk.

9 Claims, 23 Drawing Sheets

U.S. PATENT DOCUMENTS

| | | | |
|---|---|---|---|
| 6,817,023 B2 * | 11/2004 | Minase | 720/648 |
| 6,826,766 B2 * | 11/2004 | Tuchiya | 720/620 |
| 6,910,217 B2 * | 6/2005 | Kan-o | 720/646 |
| 2004/0117808 A1 * | 6/2004 | Tuchiya | 720/619 |
| 2004/0205790 A1 * | 10/2004 | Kuo | 720/620 |

FOREIGN PATENT DOCUMENTS

| | | |
|---|---|---|
| JP | 6-43899 U | 6/1994 |
| JP | 08-263975 | 10/1996 |
| JP | 8-263975 A | 10/1996 |
| JP | 11-086401 A | 3/1999 |
| JP | 11-162065 A | 6/1999 |
| JP | 11-242845 A | 9/1999 |
| JP | 11-312351 A | 11/1999 |
| JP | 2002-48207 A | 2/2002 |
| JP | 2002-048207 A | 2/2002 |
| JP | 2002-117604 A | 4/2002 |
| JP | 2002-334499 A | 11/2002 |

* cited by examiner

DISK DRIVE APPARATUS

This Application is a Continuation-in-Part and claims the benefit under 35 U.S.C. 120 of International application PCT/JP2005/014765, filed Aug. 11, 2005, which, in turn, claims priority of Japanese Patent Application No. 2004-235621, filed on Aug. 12, 2004 and Japanese Patent Application No. 2004-276028, filed on Sep. 22, 2004, the entireties of which are incorporated by reference herein.

TECHNICAL FIELD

The present invention relates to a disk drive apparatus adapted for performing recording and/or reproduction of information signals with respect to an optical disk, and more particularly relates to a disk drive apparatus adapted so that the slot-in system is employed to perform attachment/detachment of optical disk permitted to undergo attachment/detachment.

BACKGROUND ART

Hitherto, as recording media for information signals, there are provided optical disks such as CD (Compact Disk) or DVD (Digital Versatile Disk), and/or magneto optical disks such as MO (Magneto Optical Disk) or MD (mini Disk), etc., and there are used drive apparatuses using, as recording media, these disks and/or disk cartridges within which these disks are accommodated.

As the disk drive apparatuses of this kind, there are disk drive apparatuses of the type adapted to open the cover or the door provided at casing to directly load disk onto turn table faced therefrom, disk drive apparatuses adapted to mount disk with respect to disk tray which is inserted into the casing and is drawn therefrom in the horizontal direction so that disk is automatically loaded onto the turn table therewithin when the disk tray is drawn or pulled thereinto, and/or disk drive apparatuses of the type adapted for directly loading disk onto turn table provided at the disk tray. Disk drive apparatuses of any types all require operators (users) to perform such an operation to open or close the cover or the door, to insert or withdrawn the disk tray, and/or to load disk onto the turn table.

On the contrary, there are disk drive apparatuses of the so-called slot-in type adapted to only directly insert disk from disk insertion/withdrawal hole provided at the front surface of the casing into the apparatus so that the disk is automatically loaded onto the turn table. In such disk drive apparatuses, when disk is inserted from the disk insertion/withdrawl hole, there are performed a loading operation to rotate, while holding the disk between pair of guide rollers opposite to each other, these pair of guide rollers in directions opposite to each other to thereby draw or pull the disk which has been inserted from the disk insertion/withdrawal hole, and an eject operation to eject the disk from the disk insertion/withdrawal hole toward the outside of the casing.

Meanwhile, in mobile equipments, e.g., note type personal computer, etc. within which such a disk drive apparatus is mounted, further miniaturization, light weight and realization of thin structure are required. These is increased request for miniaturization, light weight and realization of thin structure of the disk drive apparatus followed thereby. Moreover, in recent years, there is strong demand for the disc drive apparatus of the slot-in type excellent in operability rather than disc drive apparatuses of the tray type which have been main current in personal computer, etc.

Since a pair of guide rollers for performing loading operation of the disk is longer than the diameter of the disk in the disk drive apparatuses of the slot-in type, size in the width direction of the entirety of the apparatus becomes large. Moreover, since the disc is caused to be held between a pair of guide rollers, the dimension (size) in the thickness direction also becomes large. For this reason, the conventional disk drive apparatuses of the slot-in type are very disadvantageous to miniaturization and/or realization of thin structure.

Particularly, disk drive apparatuses of the very thin type mounted within the note-type personal computer, etc. has the standard size in which the thickness is 12.7 mm. Further, in the case where realization of thin structure is made down to 9.5 mm which is the thickness equal to that of the hard disk drive (HDD), it very becomes difficult to use such guide roller as it is from a viewpoint of dimensions.

In view of the above, in the disk drive apparatus of the slot-in type, in order to respond to request such as miniaturization and/or realization of thin structure, there is proposed a disk drive apparatus in which plural rotational arms are disposed between disk which has been inserted from the disk insertion/withdrawal hole and base where a turn table on which the disk is loaded is attached to perform a loading operation to draw or pull the disk from the disk insertion/withdrawal hole into the casing while rotating these rotational arms within plane surface in parallel to the disk by using biasing member such as coil spring, etc. and an eject operation to eject the disk from the disk insertion/withdrawal hole toward the outside of the casing. As a disk drive apparatus of this kind, there is a disk drive apparatus described in the Japanese Patent Application Laid Open No. 2002-117604 publication.

DISCLOSURE OF THE INVENTION

Problems to be Solved by the Invention

In disk drive apparatuses of this kind, in the case of ejecting disk of the standard size in which, e.g., diameter is caused to be 12 cm, it is required that the disk does not slip off from the disk insertion/withdrawal hole while the center hole is positioned at the outer side relative to the disk insertion/withdrawal hole.

Moreover, in sticking plural boards in the manufacturing process for disk, there is the possibility that unevenness may take place in thickness from tolerance of processing accuracies of the respective boards so that disk thinner than the standard disk and/or disk thicker than that may be loaded. Moreover, when there is provided a recording disk in which disk of the DVD format where thickness of the disk board on which recording layer is formed is caused to be 0.6 mm and disk of the CD format in which thickness of the disk board on which recording layer is formed is caused to be 0.9 mm are stuck so that the thickness becomes equal to 1.5 mm, there is desired a disk drive apparatus capable of both loading the conventional disk of the standard disk in which the thickness is caused to be 1.2 mm and recording disk in which the thickness is caused to be 1.5 mm in a manner added thereto to have ability to perform recording and/or reproduction of information signals also with respect to both disks. Also in such disk drive apparatus, it is necessary to perform eject operation of disk by optimum projection quantity from the apparatus body with respect to respective disks irrespective of difference between thicknesses of corresponding disks.

In such disk drive apparatus, since eject operation of disk is performed by using only spring force of biasing member such as coil spring, etc. for rotationally biasing the rotational arm, it is impossible to control spring force of the biasing member in accordance with thicknesses and/or weights of various optical disks. As a result, projection quantity becomes unstable by difference, etc. of friction force followed by difference between weights of respective disks. Thus, it becomes difficult to provide optimum projection quantities at respective disks.

In view of the above, an object of the present invention is to provide a disk drive apparatus which solves problems that conventional disk drive apparatuses have, and which can securely perform eject operation of optical disk even in the case where any optical disk is loaded in disk drive apparatus in which plural kinds of optical discs different in thickness and/or weight can be inserted and withdrawn.

The disk drive apparatus to which the present invention is applied comprises: a casing including a front panel in which a substantially rectangular disk insertion/withdrawal hole is provided; a disk carrying mechanism including plural rotational arms for holding the outer circumference of an optical disk therebetween, and a biasing member for biasing the plural rotational arms in a predetermined direction in accordance with carrying position of the optical disk, and serving to perform carrying operation of the optical disk between a disk insertion/withdrawal position where the optical disk is caused to undergo insertion/withdrawal operation with respect to the disk insertion/withdrawal hole of the front panel and a disk loading position where the optical disk which has been inserted into the casing is loaded; a disk loading portion adapted so that the optical disk which has been carried into the into the casing is loaded; a disk rotational drive mechanism for rotationally driving the optical disk which has been loaded into the disk loading portion; an optical pick-up for performing recording and/or reproduction of information signals with respect to the optical disk rotationally driven by the disk rotational drive mechanism; and a pick-up feed mechanism for performing feed operation of the optical pick-up in a radial direction of the optical disk, wherein a slide contact piece caused to be slidably in contact with the optical disk caused to undergo insertion/withdrawal operation with respect to the disk insertion/withdrawal hole to thereby limit projection quantity of the optical disc is provided at the disk insertion/withdrawal hole.

In the disk drive apparatus, since the slide contact piece slidably comes into contact with the optical disk when the optical disk is ejected from the disk insertion/withdrawal hole so that load is given (applied) thereto, it is possible to limit projection of the optical disk when the center hole of the optical disk is faced to the outside from the disk insertion/withdrawal hole toward the outside. Thus, user grasps, by fingers, the optical disk which has been faced from the disk insertion/withdrawal hole toward the outside in a manner extending over the center hole and the outer circumferential portion to have ability to easily perform taking-out operation of the optical disc.

Moreover, also when various kinds of optical discs different in thickness and/or weight are ejected toward the outside of the casing by allowing the disk carrying mechanism to rotate the rotational arms by the biasing member, the slide contact piece is caused to undergo slide contact from a direction perpendicular to the ejection direction when the optical disk is ejected from the disk insertion/withdrawal hole, thereby making it possible to eliminate unevenness of eject output corresponding to the kind of optical disk. Thus, it is possible to stop respective optical disks at projection positions optimum therefor.

In addition, the disk drive apparatus to which the present invention is applied comprises: a casing including a front panel in which a disk insertion/withdrawal hole adapted so that an optical disk is inserted thereinto and is withdrawn therefrom is provided; a base unit including a disk loading portion adapted so that the optical disk which has been inserted from the disk insertion/withdrawal hole of the front panel into the casing is loaded, a disk rotational drive mechanism for rotationally driving the optical disk which has been loaded into the disk loading portion, an optical pick-up for performing write and/or read operations of signals with respect to the optical disk rotationally driven by the disk rotational drive mechanism, and a pick-up feed mechanism for allowing the optical pick-up to perform feed operation in a radial direction of the optical disk, the disk loading portion, the disk rotational drive mechanism, the optical pick-up and the pick-up feed mechanism being integrally provided onto the base; a disk carrying mechanism in which plural rotational arms for holding the outer circumference of the optical disk therebetween, and a biasing member for biasing the plural rotational arms in a predetermined direction in accordance with carrying position of the optical disk are provided to perform carrying operation of optical disks having outer diameters different from each other between a disk insertion/withdrawal position where the optical disk is caused to undergo insertion/withdrawal operation with respect to the disk insertion/withdrawal hole of the front panel and a disk loading position where the optical disk is loaded into the disk loading portion, wherein a slidable contact piece caused to be slidably in contact with the optical disk which is caused to undergo insertion/withdrawal operation with respect to the disk insertion/withdrawal hole is provided, and a panel curtain permitted to be inclined in the insertion/withdrawal direction of the optical disk is provided at the back (rear) surface side of the front panel.

In this disk drive apparatus, since the slide contact piece or the slide contact portion of the panel curtain provided at the disk insertion/withdrawal portion is slidably in contact with one surface of the optical disk when the optical disk is ejected, also in the case where eject operation of various optical disks different in diameter and/or weight is performed, projection quantity of the optical disk ejected from the disk insertion/withdrawal hole is limited by slide friction of the curtain panel. Thus, it is possible to project the optical disk to an optimum position.

Still further objects of the present invention and practical merits obtained by the present invention will become more apparent from the embodiments which will be given below with reference to the attached drawings.

BEST MODE FOR CARRYING OUT THE INVENTION

Figure 1:
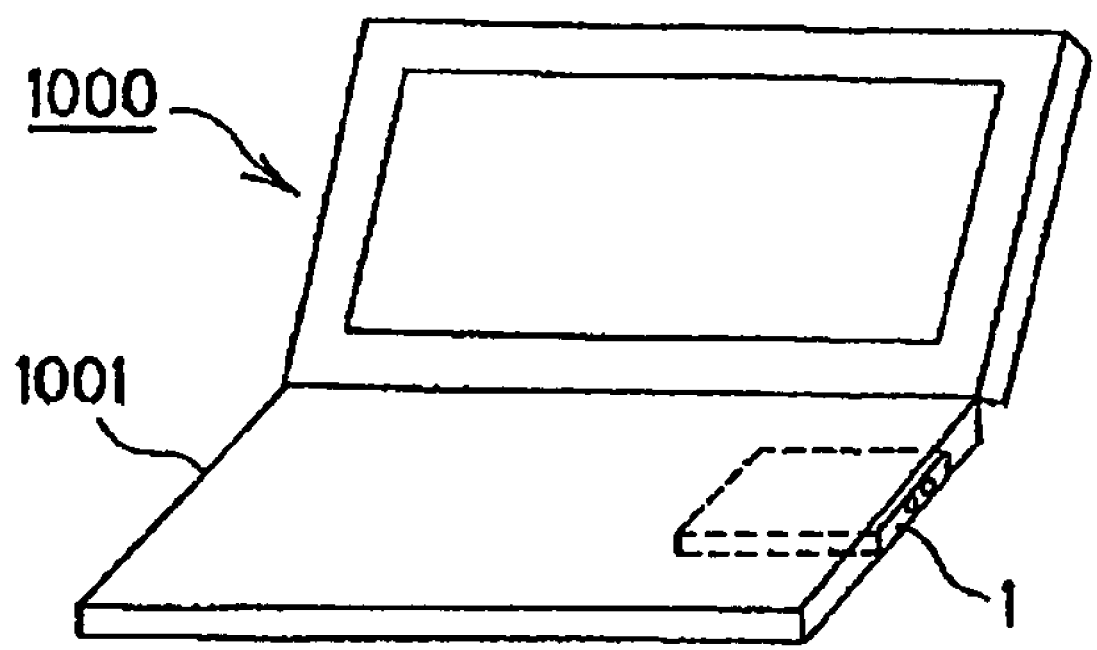
FIG. 1 is a perspective view showing outer appearance of note type personal computer within which disk drive apparatus is mounted.
Figure 2:
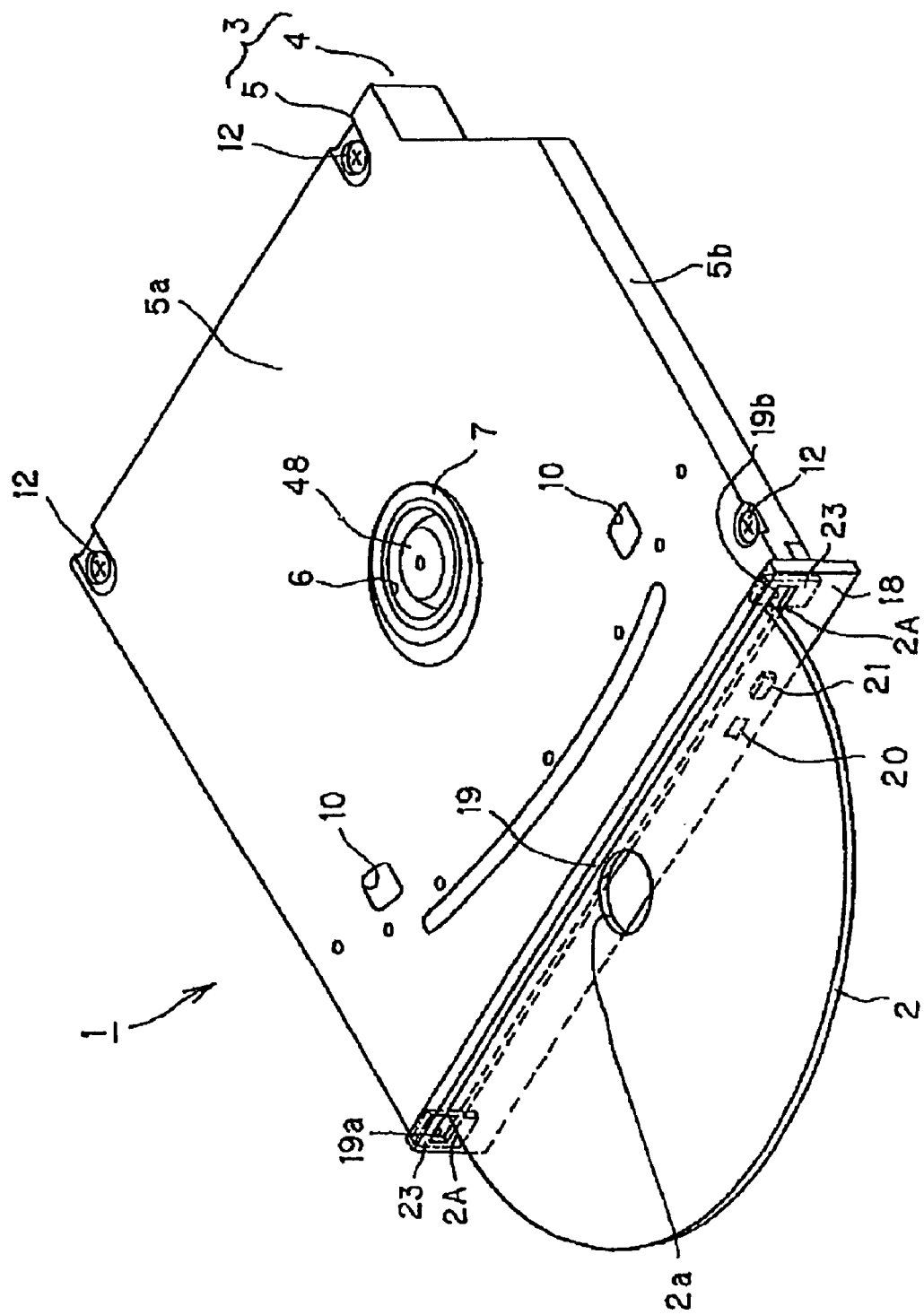
FIG. 2 is an outer appearance perspective view showing disk drive apparatus from which optical disk has been ejected to optimum eject position.

Embodiments of a disk drive apparatus according to the present invention will be described in detail with reference to the attached drawings. For example, as shown in FIG. 1, the disk drive apparatus 1 according to this embodiment is mounted within an apparatus body 1001 of a note type personal computer 1000. The disk drive apparatus 1 is caused to be of the configuration in which the slot-in system is employed to perform drive operation of an optical disk 2. As shown in FIG. 2, the disk drive apparatus 1 is caused to be of the configuration in which thin structure is realized to a degree such that the thickness of the entirety of the apparatus becomes equal to about 12.7 mm, and optical disk 2 such as CD (Compact Disc) or DVD (Digital Versatile Disc) is used as recording medium to perform recording or reproduction of information signals onto the optical disk 2.

As shown in FIG. 2, the disk drive apparatus 1 comprises a casing 3 constituting the apparatus body. The casing 3 is composed of a substantially flat box-shaped bottom case 4 serving as a lower casing, and a top cover 5 serving as a top plate which covers the upper opening portion of the bottom case 4.

Figure 3:
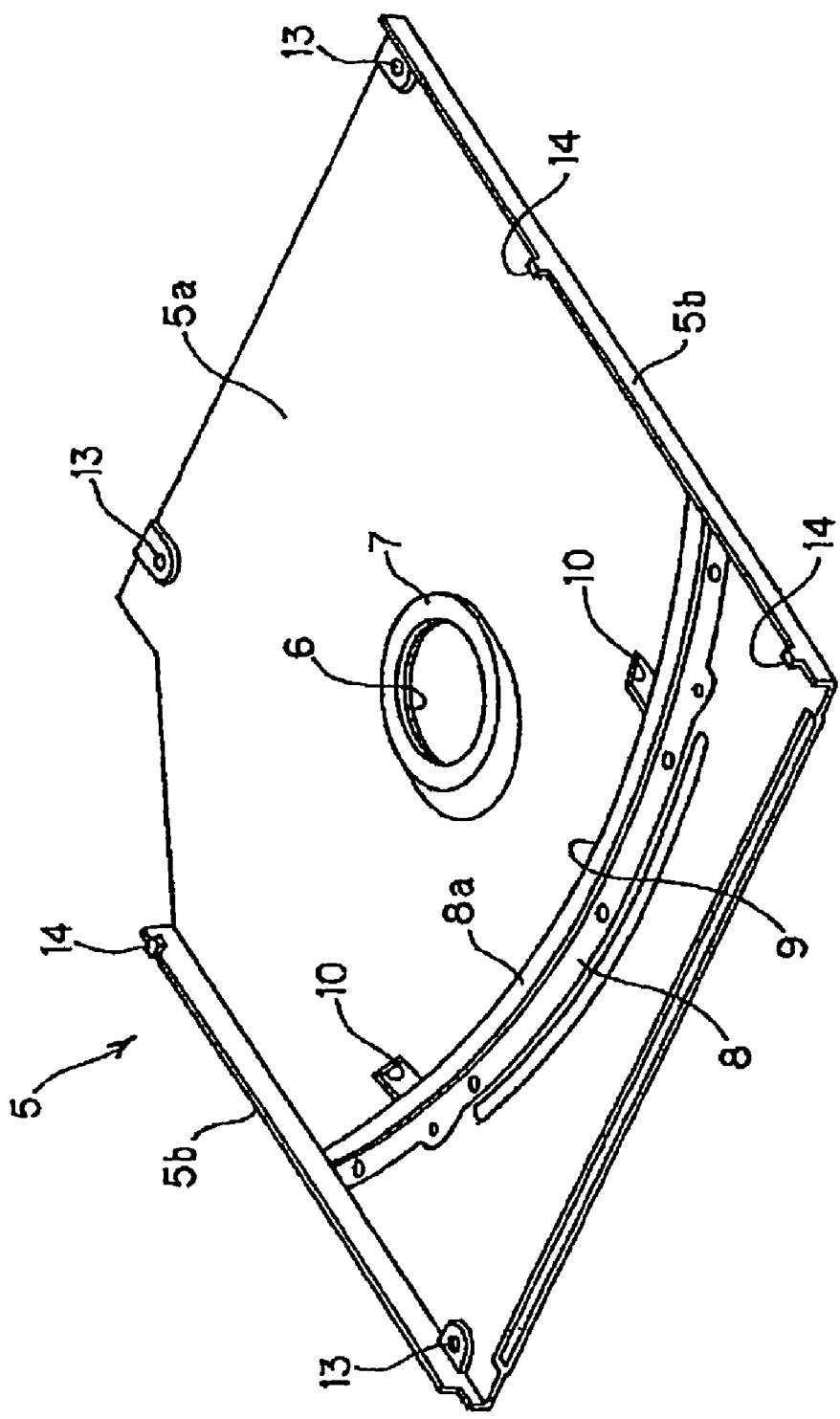
FIG. 3 is a perspective view showing top cover when viewed from the internal surface side.

As shown in FIGS. 2 and 3, the top cover 5 is comprised of thin metallic plate, and includes a top plate portion 5a for closing the upper opening portion of the bottom case 4, and a pair of side plate portions 5b in which the periphery of the top plate portion 5a is slightly bent along both side surfaces of the bottom case 4. Substantially at the central portion of the top plate portion 5a, there is formed a substantially circular opening portion 6. The opening portion 6 serves to face an engagement projection 48a of a turn table 47 engaged with center hole 2a of the optical disk 2 toward the outside at the time of chucking operation which will be described later. Moreover, at the periphery of an opening portion 6 of the top plate portion 5a, a contact projection 7 adapted to come into contact with the periphery of the center hole 2a of the optical disk 2 mounted on the turn table 47 to thereby perform chucking operation is formed in a manner slightly projected toward the inside of the casing 3.

At the internal surface of the top plate portion 5a, there is provide a guide member 8 for guiding the front end portion of a first rotational arm 61 and the front end portion of a second rotational arm 62 which will be described later in directions close to each other or apart from each other while limiting the front end portion of the first rotational arm 61 and the front end portion of the second rotational arm 62. The guide member 8 is comprised of sheet metal so as to take substantially arcuate shape over the range between both side plate portions 5b of the top plate portion 5a, and is attached to the front face side of the top plate portion 5a by spot welding, etc. Moreover, the guide member 8 includes an offset portion 8a in which the rear face side is caused to be higher than the attachment surface of the front face side by one step. Thus, between the offset portion 8a of the rear face side of the guide member 8 and the top plate portion 5a, there is formed a guide groove 9 with which the front end portion of the first rotational arm 61 and the front end portion of the second rotational arm 62 are engaged. Moreover, at the top plate portion 5a, there are respectively provided window portions 10 for work which are adapted for engaging the front end portion of the first rotational arm 61 and the front end portion of the second rotational arm 62 with the guide groove 9.

Figure 4:
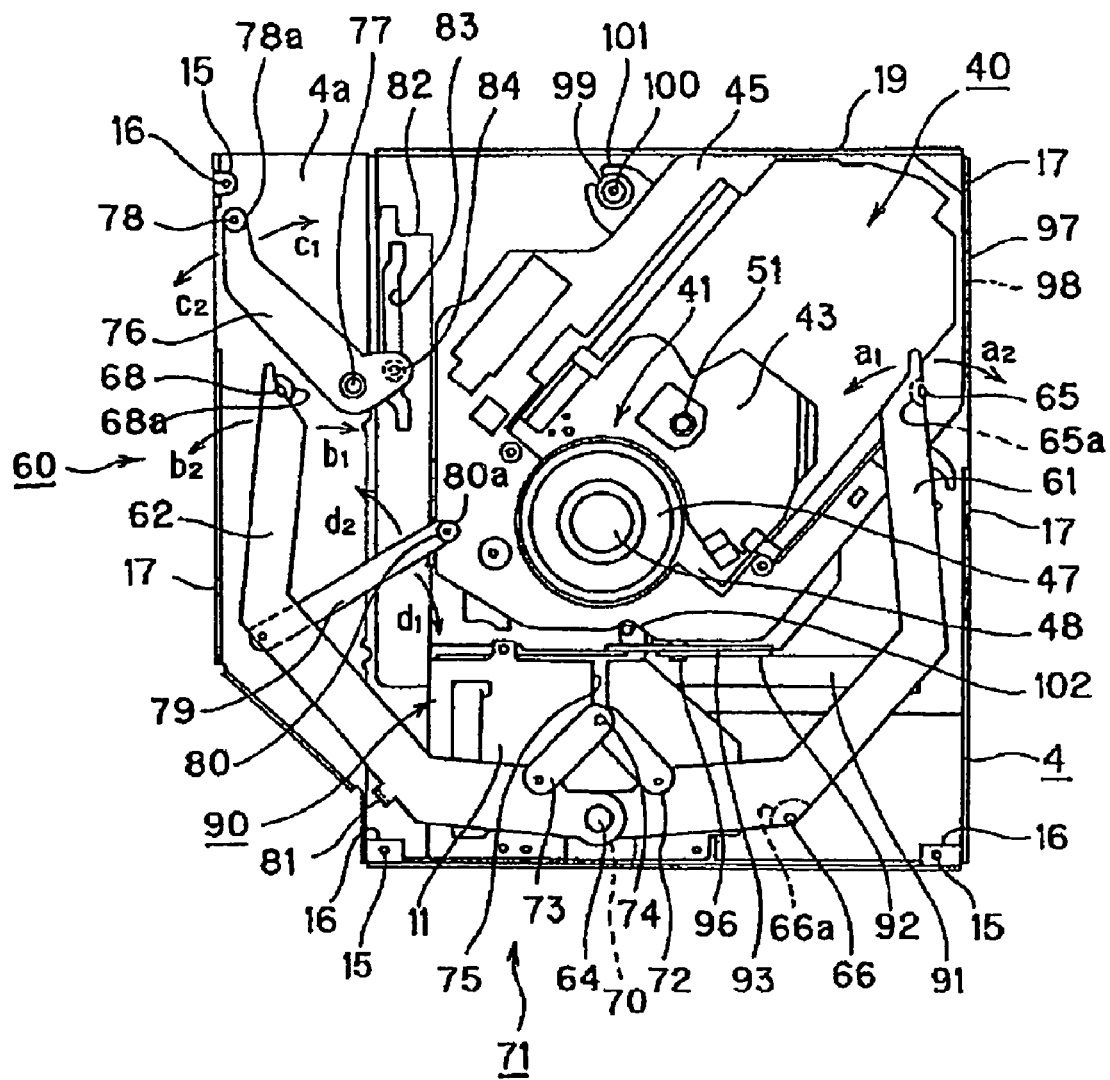
FIG. 4 is a plan view showing the configuration of the disk drive apparatus.

As shown in FIG. 4, the bottom case 4 is composed of sheet metal formed so as to take substantially flat plate shape, wherein the bottom surface portion thereof is substantially rectangular, and a deck portion 4a which is bottom-raised from the bottom surface portion so that it is projected toward the outside is provided at one side surface portion. Moreover, at the bottom surface portion of the bottom case 4, although illustration is omitted, there is attached, by screw-fitting, circuit board on which electronic parts (components) such as IC chip, etc. constituting drive control circuit, connectors for realizing electric connections of respective portions and/or detection switches for detecting the operations of respective portions, etc. are arranged. Moreover, at the bottom surface portion of the bottom case 4, a chassis 11 is attached by screw-fitting. The chassis 11 is arranged, at the upper portion of the circuit board, in a manner to partition the inside of the bottom case 4 in upper and lower directions at height substantially equal to the deck portion 4a.

As shown in FIG. 2, the top cover 5 is attached to the bottom case 4 by screw-fitting. In concrete terms, at the outer circumferential edge portion of the top plate portion 5a, as shown in FIG. 3, there are formed plural penetration holes 13 adapted so that screws 12 are penetrated therethough. Moreover, at the side plate portion 5b of both sides, there are provided plural guide pieces 14 bent substantially perpendicular to the inside. On the other hand, at the outer circumferential edge portion of the bottom case 4, as shown in FIG. 4, there are provided plural fixing pieces 15 bent substantially perpendicular to the inside. At these fixing pieces 15, there are formed screw holes 16 corresponding to penetration holes 13 of the top cover 5. Moreover, at both side surface portions of the bottom case 4, there are formed plural guide grooves 17 serving as prevention of slip off of plural guide pieces 14 of the top cover 5.

In attaching the top cover 5 to the bottom case 4, the top cover 5 is slid from the front face side toward rear face side in the state where plural guide pieces 14 of the top cover 5 are engaged with plural guide grooves 17 of the bottom case 4. Thus, there results the state where the top plate portion 5a of the top cover 5 closes the upper opening portion of the bottom case 4. In this state, screws 12 are screw-fitted into screw holes 16 of the bottom case 4 through plural penetration holes 13 of the top cover 5. In a manner as stated above, the casing 3 shown in FIG. 2 is constituted.

In this example, label (not shown) for covering opening portion 6 and/or window portion 10 for work which have been described above is attached to the top plate portion 5a of the top cover 5 after assembling. Thus, it is prevented that dust, etc. is admitted into the casing.

Figure 5:
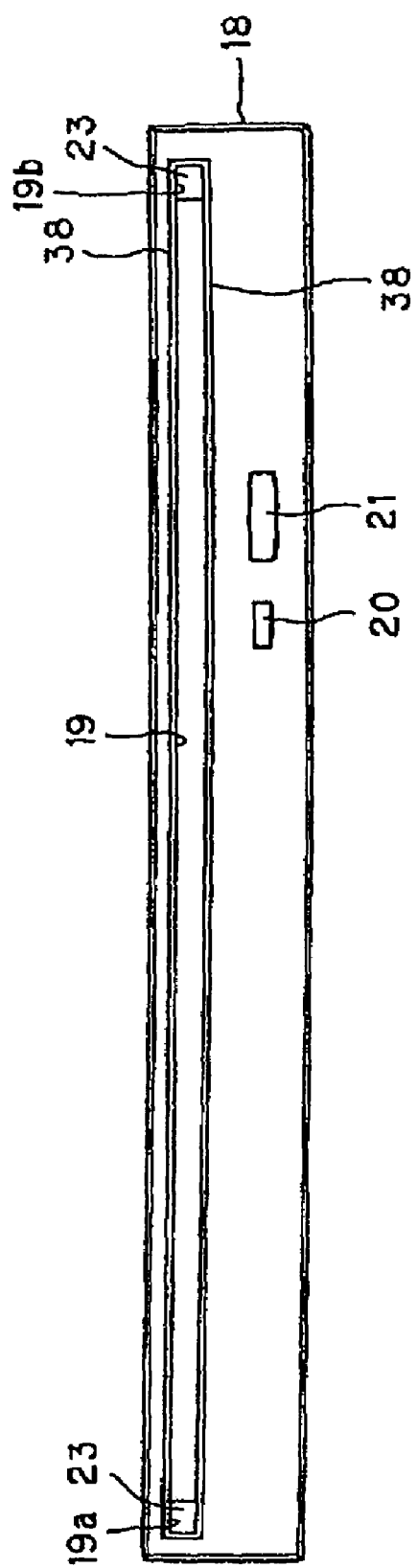
FIG. 5 is a front view showing front panel.

As shown in FIG. 2, a substantially rectangular flat plate shaped front panel 18 is attached to the front surface of the casing 3. At the front panel 18, there is provided a disk insertion/withdrawal hole 19 into which the optical disk 2 is inserted thereinto and is ejected therefrom in plane direction of the disk. Namely, the optical disk 2 is permitted to be inserted from the disk insertion/withdrawal hole 19 into the casing 3, or is permitted to be ejected from the disk insertion/withdrawal hole 19 toward the outside of the casing 3. Moreover, as shown in FIG. 5, at the front surface of the front panel 18, there are provided a display unit 20 for displaying, by lighting, access state with respect to the optical disc 2, and an eject button 21 pressed when the optical disk 2 is ejected.

In this example, in order to guide the optical disk 2 toward the central portion, the disk insertion/withdrawal hole 19 has a shape such that the size in a thickness direction of the central portion is the largest and the size in the thickness direction slightly becomes small according as position shifts toward both end portions. Moreover, at upper and lower surfaces of the disk insertion/withdrawal hole 19, there are provided inclined surfaces 38 inclined in directions close to each other from the front surface side of the front panel 18 toward the inside of the casing 3. The inclined surfaces 38 serve to invite the optical disk 2 into disk insertion/withdrawal hole 19 at the time of disk insertion.

Figure 6:
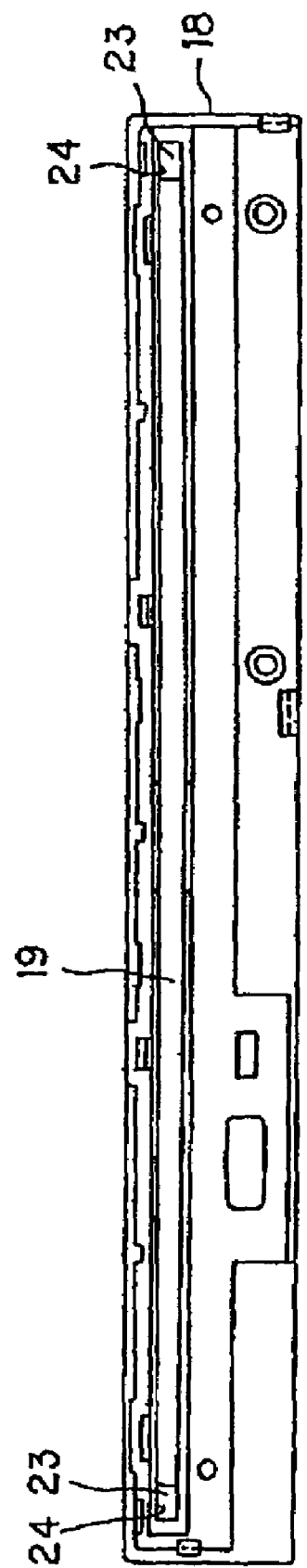
FIG. 6 is a back view showing front panel.
Figure 7:
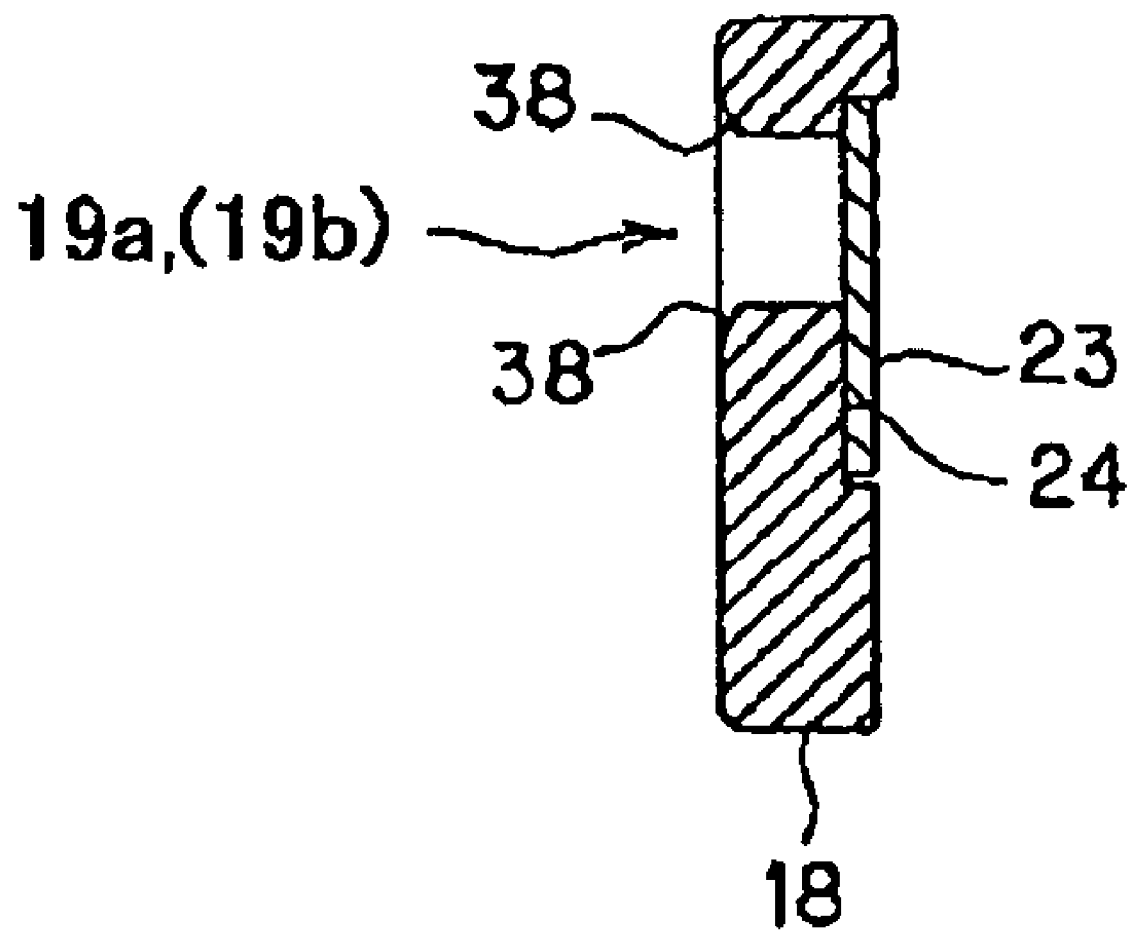
FIG. 7 is a cross sectional view showing the front panel of the disk drive apparatus.

The disk insertion/withdrawal opening 19 is rectangular opening having length slightly longer than the diameter of the optical disk 2 and height slightly longer than thickness of the optical disk 2 along the length direction of the front panel 18. Moreover, at the disk insertion/withdrawal hole 19, as shown in FIGS. 5 and 6, slide contact pieces 23 caused to be slidably in contact with the outer circumference of the optical disk 2 caused to undergo insertion/withdrawal with respect to the casing 3 are provided at both end portions 19a, 19b in length direction. As the slide contact piece 23, there is used, e.g., black artificial leather suede (material in which polyurethane resin is impregnated in polyester fiber). As shown in FIG. 7, the slide contact piece 23 is attached to an accommodating recessed portion 24 formed at the rear face side of the front panel 18 through adhesive agent, etc.

Further, when the optical disk 2 is inserted into the disk insertion/withdrawal hole 19, or is ejected from the disk insertion/withdrawal hole 19 as shown in FIG. 2, the slide contact piece 23 is slidably in contact with the outer circumferential portion 2A in a direction perpendicular to the insertion/withdrawal direction of the optical disk 2 in the state where the optical disk 2 is faced toward the outside of the casing 3 to a degree of about one half. Thus, since the slide contact piece 23 relatively slidably comes into contact with the outer circumferential portion 2A of the optical disk 2, load is given (applied) to insertion force or eject force of the optical disk 2. As a result, it is possible to suppress insertion force or eject force.

When the optical disk 2 is inserted into the casing 3, load is applied the moment it is inserted into the casing 3 to a degree of about one half. However, insertion of the optical disk 2 is subsequently continued by user, and is transferred to disk carrying mechanism 60 which will be described later. Thus, the optical disk 2 is loaded into the disk loading portion of the casing 3 by the disk carrying mechanism 60. On the other hand, when the optical disk 2 is ejected toward the casing 3 outside, load is applied with respect to eject output of the optical disk by the disk carrying mechanism 60. Thus, eject quantity of the optical disk 2 is optimized. Namely, since the slide contact piece 23 is slidably in contact with the outer circumferential portion 2A of the optical disk 2 when the optical disk 2 has been ejected to a degree of about one half to give (apply) load thereto, it is possible to stop eject operation of the optical disk 2 when the center hole 2a of the optical disk 2 is faced to the outside from the disk insertion/withdrawal hole 19. Thus, user grasps the inner circumference of the center hole 2a of the optical disk 2 and the outer circumferential portion of the optical disk 2 which has been faced toward the outside from the disk insertion/withdrawal hole 19, thus making it possible to easily perform draw-out operation of the optical disc 2.

Moreover, also when the disk carrying mechanism 60 rotates first and second rotational arms 61, 62 by a torsion coil spring 70 to thereby eject various optical disks different in thickness and/or weight toward the casing 3 outside in a manner as described later, the slide contact piece 23 comes slidably contact with the outer circumferential portion 2A in a direction perpendicular to the eject direction when the optical disk 2 is ejected from the disk insertion/withdrawal hole 19 to a degree of about one half to thereby eliminate unevenness of eject output corresponding to the kind of the optical disk 2, thus to have ability to stop respective optical disks 2 at eject positions optimum therefor.

Further, since the optical disk 2 which has been ejected from the disk insertion/withdrawal hole 19 is held by friction with respect to slide contact piece 23 at the position where the center hole 2a thereof is exposed toward the outside of the casing 3 from the disk insertion/withdrawal hole 19, it is possible to prevent the optical disk 2 from being slipped off from the disk insertion/withdrawal hole 19 by self-weight.

It is to be noted that the above-described slide contact piece may be provided at any one of end portion in a length direction of the disk insertion/withdrawal hole in addition to the fact that the slide contact pieces are provided at both end portions in a length direction of the disk insertion/withdrawal hole. Moreover, design may be made such that loads respectively given or applied to the optical disk 2 are different from each other with respect to a pair fo slide contact pieces provided at both end portion in the length direction.

In this example, plural holding pieces for attaching the front panel 18 to the front surface of the casing 3 are provided at rear (back) surface side of the front panel 18 shown in FIG. 6.

Figure 8:
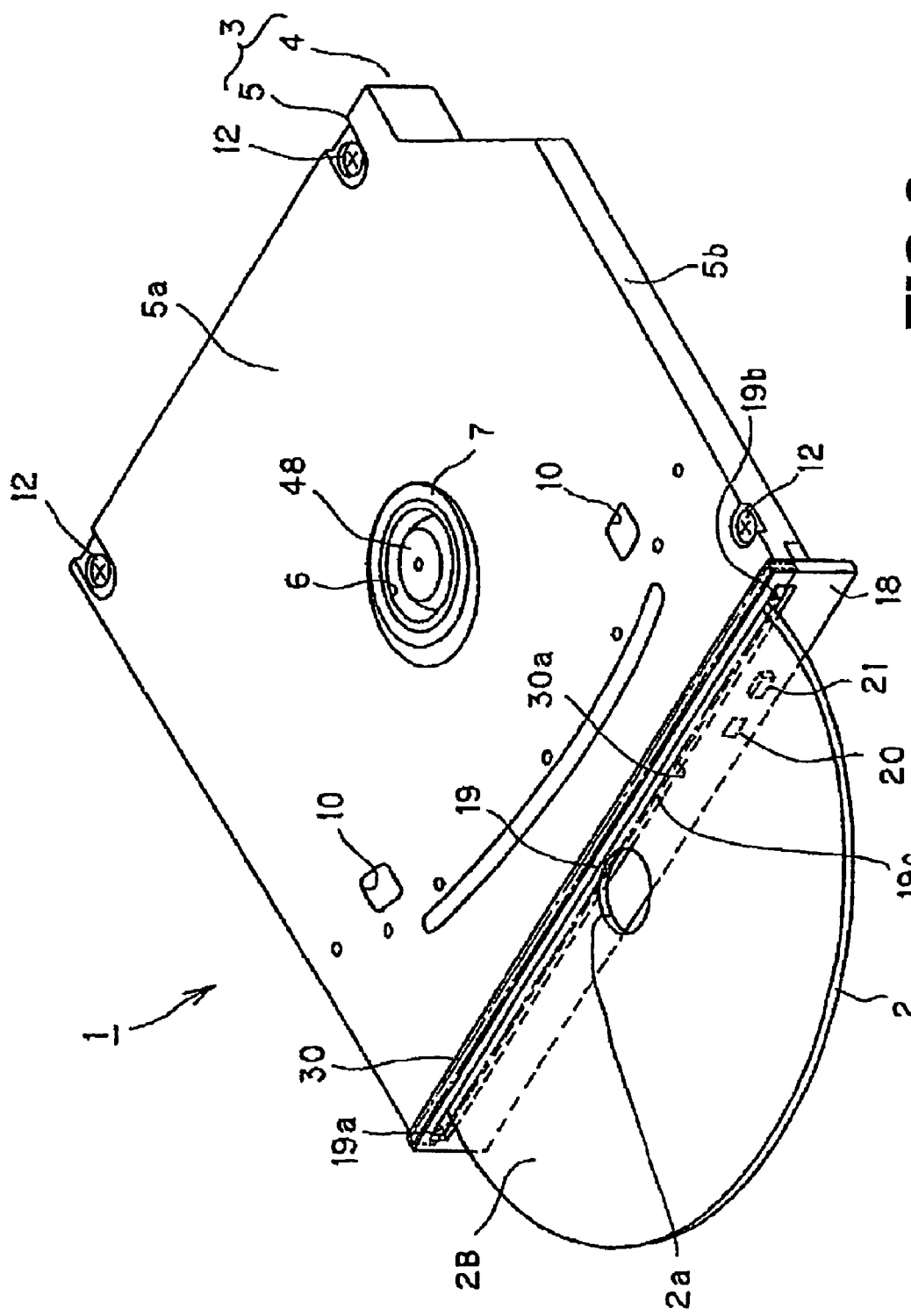
FIG. 8 is a perspective view showing another example of the front panel to which the present invention is applied.

Further, in the disk drive apparatus 1, there may be provided a panel curtain 30 for limiting eject quantity of the optical disk ejected from the disk insertion/withdrawal hole 19 of the front panel 18 in place of the slide contact piece 23 or along with the slide contact piece 23. The panel curtain 30 is constituted by using, e.g., black artificial leather suede (material in which polyurethane resin is impregnated in polyester fiber) similarly to the above-described slide contact piece 23. As shown in FIG. 8, the panel curtain 30 is attached to an accommodating recessed portion 31 formed at the rear (back) side of the front panel 18 over the range from one end toward the other end in the length direction of the disk insertion/withdrawal hole 19.

Figure 9:
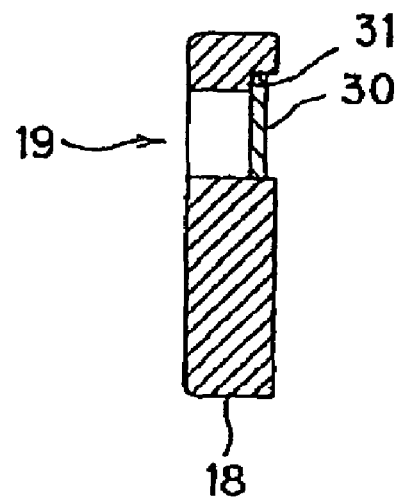
FIG. 9 is a cross sectional view showing front panel in which panel curtain is provided.

Further, as shown in FIG. 9, the panel curtain 30 is provided so that lower edge portion 30a of the panel curtain 30 is faced from the disk insertion/withdrawal hole 19 and is caused to serve as free end which is not fixed by adhesive agent, etc., and is positioned at height substantially equal to the lower side edge 19c of the disk insertion/withdrawal hole 19. Thus, at the panel curtain 30, the lower edge portion 30a is slidably in contact with the upper surface 2B of the optical disk 2 caused to undergo insertion/withdrawal relative to the disk insertion/withdrawal hole 19, and dust, etc. is prevented from being admitted into the casing 3.

At the panel curtain 30, when the optical disk 2 is inserted into the disk insertion/withdrawal hole 19 or is ejected therefrom, the lower edge portion 30a caused to serve as free end slidably comes into contact with the upper surface 2B in a direction perpendicular to the insertion/withdrawal direction of the optical disk 2. Thus, since the slide contact piece 23 relatively slidably comes into contact with the upper surface 22B of the optical disk 2, load is given (applied) to insertion input or eject output of the optical disk 2 thus to have ability to suppress insertion input or eject output.

Figures 10A, 10B:
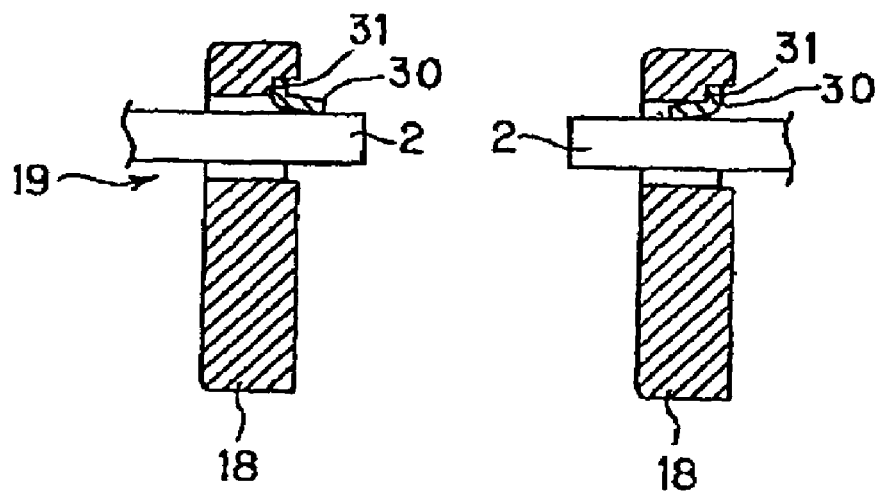
FIGS. 10A and 10B are cross sectional views showing panel curtain caused to be slidably in contact with optical disk.

As shown in FIG. 10A, when the optical disk 2 is inserted into the casing 3, load is given (applied) to the optical disk 2, but insertion of the optical disk 2 is continued by user so that the optical disk 2 is transferred to the disk carrying mechanism 60. Thus, the optical disk 2 is loaded into the disk loading portion. On the other hand, as shown in FIG. 10B, when the optical disk 2 is ejected toward the outside of the casing 3, load is applied with respect to eject output of the optical disk 2 by the disk carrying mechanism 60. Thus, eject quantity of the optical disk 2 is optimized. Namely, since the panel curtain 30 is slidably in contact with the principal surface portion 2B of the optical disk 2 so that load is given (applied) thereto, in the case where various optical disks different in thickness and/or weight are used, it is possible to prevent jumping-out operation from the disk insertion/withdrawal hole 19 of the optical disk 2 also in the case where eject output by the disk carrying mechanism 60 is larger with respect to the optical disk 2.

It is to be noted that the panel curtain 30 may have length sufficient to cover a portion of the length direction of the disk insertion/withdrawal hole 19 in addition to the fact that the panel curtain 30 has length extending from one end to the other end of the length direction of the disk insertion/withdrawal hole 19. Moreover, rigidity of the panel curtain 30 can be changed by adjusting the thickness or the length thereof. In the panel curtain, the length in the length direction or the length in upper and lower directions of the disk withdrawal hole at the upper surface side of the optical disk 2 thereof and the length in the length direction or the length in upper and lower directions of the disk withdrawal hole at the lower surface side of the optical disk 2 thereof may be caused to be different from each other thus to adjust load given to the optical disk 2. Thus, load given (applied) to eject output of the optical disk 2 is adjusted to have ability to effectively prevent jumping-out of the optical disk 2.

Moreover, the panel curtain 30 may be stuck in a manner to cover the entirety of the disk insertion/withdrawal hole 19 from the rear (back) face side of the front panel 18, and may be slidably in contact with the optical disk 2 by providing cut portions caused to undergo insertion/withdrawal substantially at the intermediate portion in a height direction of the disk insertion/withdrawal hole 19. Moreover, a pair of upper and lower curtain pieces faced from the lower edge portion 19c and the upper side edge 19d of the disk insertion/withdrawal hole 19 may be provided to allow these curtain pieces to be slidably in contact with the optical disk 2.

Figure 11A:
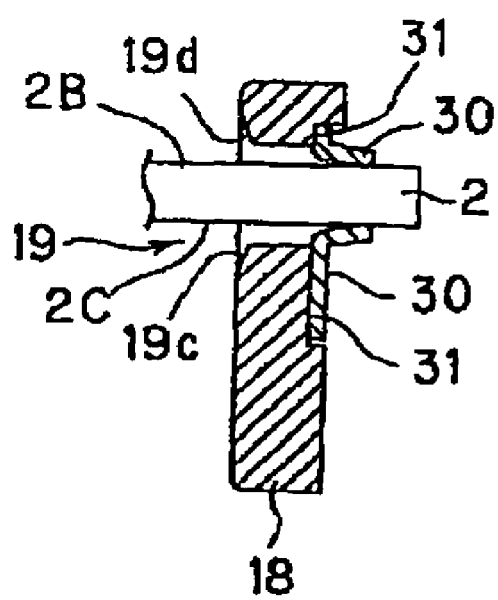
FIGS. 11A and 11B are cross sectional views showing another example of panel curtain caused to be slidably in contact with optical disk.
Figure 11B:
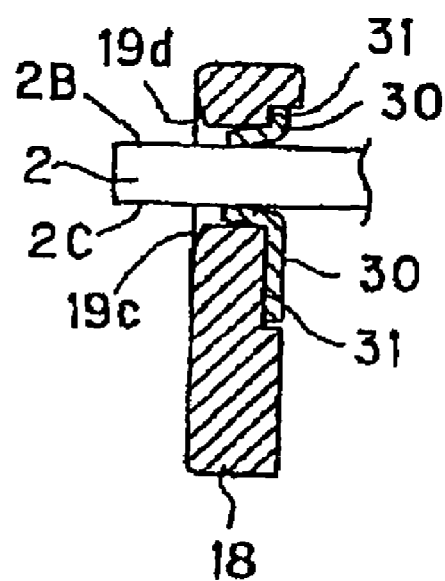

In this case, as shown in FIGS. 11A and 11B, the panel curtain 30 is slidably in contact with the upper surface side principal surface portion 2B and the lower surface side principal surface portion 2C of the optical disk 2 at the time of insertion and at the time of ejection of the optical disk 2. Particularly, eject output by the disk carrying mechanism 60 is effectively suppressed at the time of ejection of the optical disk 2. Thus, it is possible to prevent jumping-out from the disk insertion/withdrawal hole 19 of the optical disk 2.

Figure 12:
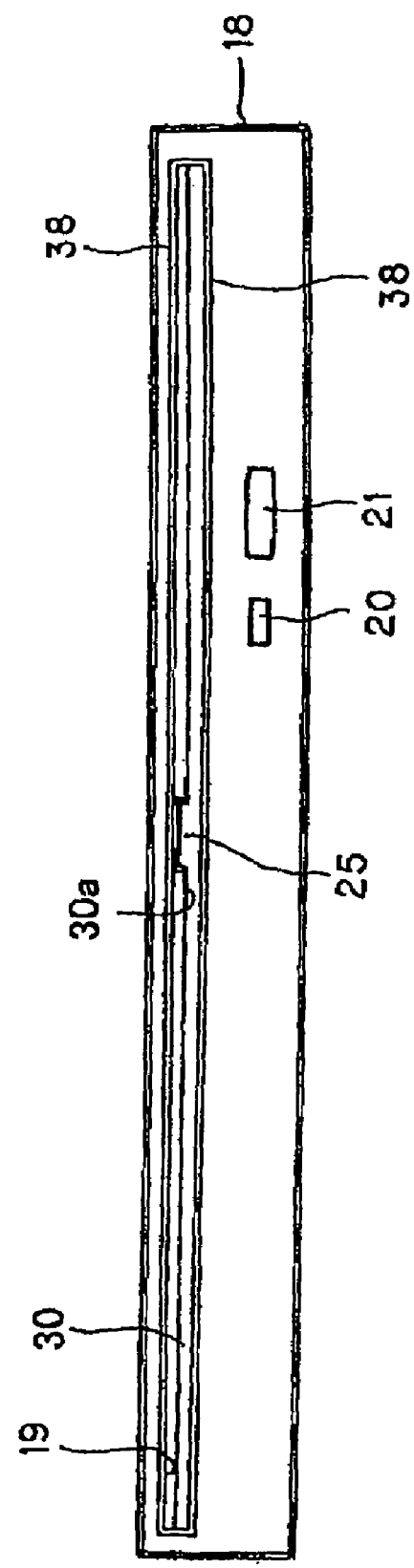
FIG. 12 is a front view showing a further example of the front panel.
Figure 13:
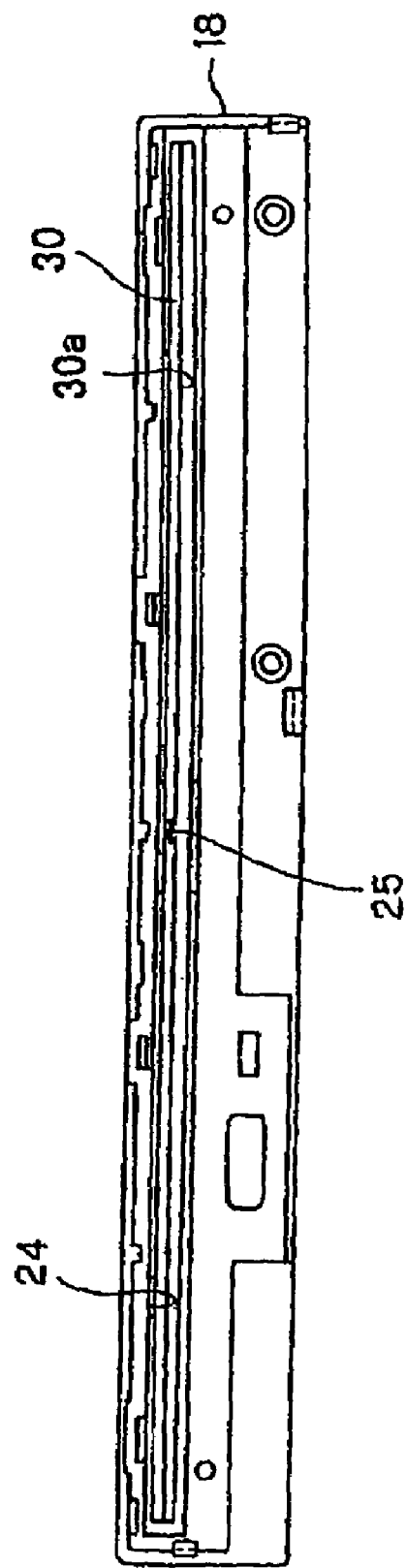
FIG. 13 is a back view showing the further example of the front panel.

Moreover, as shown in FIGS. 12 and 13, the panel curtain 30 may be caused to be of the configuration in which there is provided a slide contact portion 25 caused to be slidably in contact with the optical disk 2 ejected from the disk insertion/withdrawal hole 19 of the front panel 18 to thereby limit projection quantity of the optical disk 2. As shown in FIG. 14B, the slide contact portion 25 is formed within a non-recording region 32a around the center hole 2a of the optical disk 2 shown in FIG. 14A, for example, by using the same material as the panel curtain 30 and is projected in upper direction or in lower direction from substantially the central portion in left and right directions of the panel curtain 30 in correspondence with an offset portion 33 formed between a clamp region 32 clamped to the turn table 47 and a region having thickness of the outer circumferential side from the clamp region 32. Moreover, the slide contact portion 25 is formed integrally with the panel curtain 30, but the panel curtain 30 may be formed so as to take rectangular shape, and the slide contact portion 25 may be formed in a manner stuck to the panel curtain 30 from the rear (back) face side.

Such slide contact portion 25 slides onto one surface of the optical disk 2 when the optical disk 2 is ejected from the disk insertion/withdrawal hole 19 as the result of the fact that first and second rotational arms 61, 62 which will be described later are rotated by biasing force of torsion coil spring 70, and slidably comes into contact therewith in a manner to ride on the offset portion 33. Thus, eject output is suppressed by slide friction of the slide contact portion 25. As a result, the optical disk 2 is ejected up to the position where the center hole 2a is faced from the disk insertion/withdrawal hole 19. Accordingly, user can grasp or hold the center hole 2a of the optical disk 2 faced to the outside of the apparatus from the disk insertion/withdrawal hole 19. Thus, user can easily take out the optical disk 2 from the disk drive apparatus 1.

As stated above, also in the disk drive apparatus 1, also in the case where optical disks 2 different in diameter and/or thickness are ejected by using the first and second rotational arms 61, 62, the slide contact portion 25 is caused to be slidably in contact therewith to thereby suppress an eject output applied to the optical disk 2, thus making it possible to project the respective optical disks 2 to optimum positions corresponding thereto.

Figure 14A:
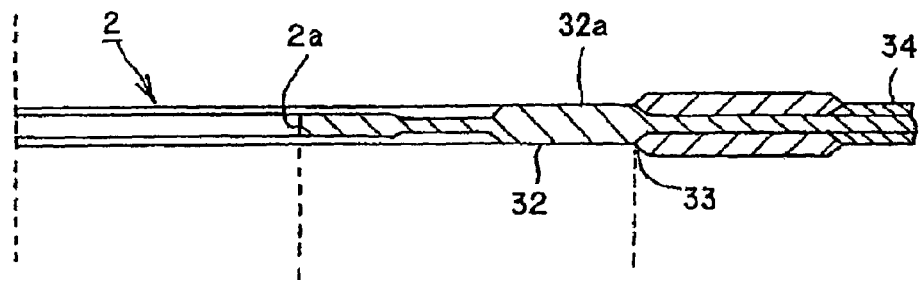
FIGS. 14A, 14B and 14C are views showing the relationship between slide contact piece provided at panel curtain and optical disk.
Figure 14B:
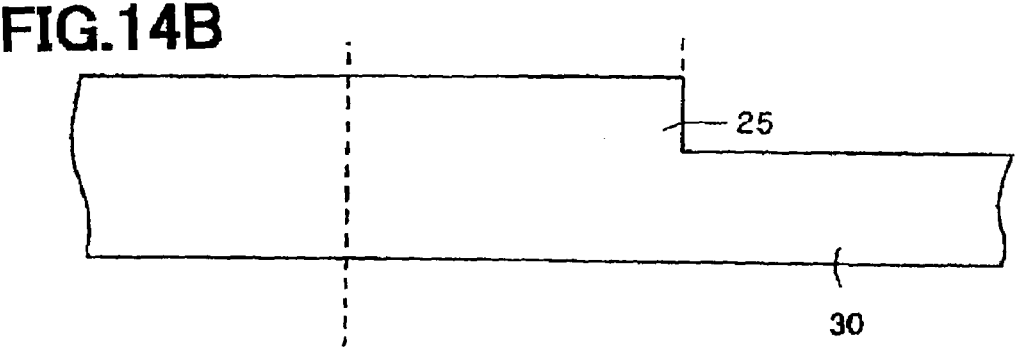

Here, at the optical disk 2, as shown in FIG. 14A, there are formed, from the center hole 2a into which an engagement projection 48a of the turn table 47 provided at the disk drive apparatus 1 side is inserted toward the outer circumferential side, a non-recording region 32a serving as a clamp region, etc. with respect to the turn table 47, and a recording region 34 where pits, etc. are formed. Further, within the non-recording region 32a, there are further formed a clamp region 32 mounted on the turn-table 47, and an offset portion 33 for realizing positioning on the turn table 47.

Accordingly, at the disk drive apparatus 1, in order to optimize disk eject quantity from the disk insertion/withdrawal hole 19 into which various optical disks 2 are inserted and from which they are drawn therefrom, except that slide contact portion 25 is formed within the region corresponding to the above-described offset portion 33, slide contact portion 25 may be provided in correspondence with the clamp region 32 of the center hole 2a side of the optical disk 2 from the offset portion 33, for example. Namely, at the disk drive apparatus 1, as shown in FIG. 14, slide contact portion 25 may be formed in correspondence with an arbitrary portion of the region from the center hole 2a of the optical disk 2 toward the offset portion 33.

Figure 14C:
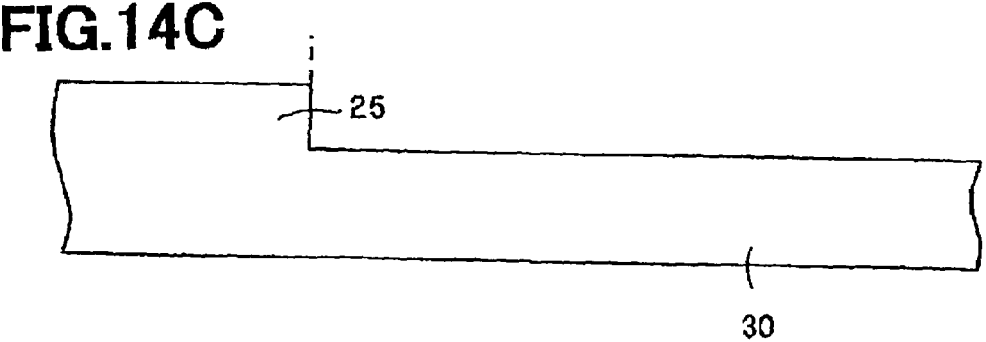

Further, at the disk drive apparatus 1, slide contact portion 25 may be formed in correspondence with the diameter of the center hole 2a of the optical disk 2. Namely, as shown in FIG. 14C, in the disk drive apparatus 1, slide contact portion 25 having the same length as the diameter of the center hole 2a of the optical disk 2 is provided within movement region of the center hole 2a. By providing such slide contact portion 25, in the disk drive apparatus 1, also in the case where the optical disk 2 is ejected from the disk insertion/withdrawal hole 19 by the first and second rotational arms 61, 62 as described later, the slide contact piece 25 is held at the center hole 2a while slidably being in contact with one surface of the optical disk 2. Accordingly, in the disk drive apparatus 1, also in the case where eject output by rotation of the first and second rotational arms 61, 62 is large as compared to the diameter and/or the thickness, etc. of the optical disk 2, the slide contact portion 25 is held within the center hole 2a to thereby prevent jumping-out from the disk insertion/withdrawal hole 19, and to have ability to provide an optimum projection quantity where the center hole 2a is stopped at the position projected toward the outside from the disk insertion/withdrawal hole 19.

In this example, in order to guide the optical disk 2 toward the central portion, the disk insertion/withdrawal hole 19 has a shape such that the size in the thickness direction of the central portion is the largest and the size in the thickness direction slightly becomes small according as position shifts toward both end portions. Moreover, at upper and lower surfaces of the disk insertion/withdrawal hole 19, there are provided inclined surfaces 38 inclined in directions close to each other from the front surface side of the front panel 18 toward the inside of the casing 3. The inclined surface 38 serves to invite the optical disk 2 into the disk insertion/withdrawal hole 19 at the time of disk insertion.

In the disk drive apparatus 1 constituted as stated above, the disk insertion/withdrawal hole 19 is covered by panel curtain 30 except when the optical disk 2 is inserted or ejected as shown in FIG. 9, thereby making it possible to prevent dust, etc. from being admitted from the disk insertion/withdrawal hole 19 into he casing 3.

Further, in the disk drive apparatus 1, as shown in FIG. 10A, the optical disk 2 is inserted from the disk insertion/withdrawal hole 19 into the casing 3 through cut portion 30a of the panel curtain 30. At this time, since the panel curtain 30 is inclined in insertion direction of the optical disk 2 while being slidably in contact with the optical disk 2, but the rear (back) surface side of the front panel 18 is greatly opened, it is possible to easily insert the optical disk 2 into the casing 3 while maintaining the state where the panel curtain 30 is inclined in insertion direction of the optical disk 2.

On the other hand, in the disk drive apparatus 1, as shown in FIG. 10B, the optical disk 2 is ejected from the disk insertion/withdrawal hole 19 toward the outside of the casing 3 through cut portion 30a of the panel curtain 30. At this time, the panel curtain 30 is inclined in eject direction of the optical disk 2 while being slidably in contact with the optical disk 2, and the slide contact portion 25 provided in correspondence with offset portion 33 and/or center hole 2a of the optical disk 2 is slidably contact with the offset portion 33 and/or the center hole 2a to prevent jumping-out of the optical disk 2 by unevenness of eject outputs optimum for various optical discs 2. Thus, it is possible to stop the optical disk 2 at eject positions where the center hole 2a has been ejected from the disk insertion/withdrawal hole 19.

In addition, since the center hole 2a of the optical disk 2 ejected from the disk insertion/withdrawal hole 19 is held by friction with respect to the panel curtain 30 at the position exposed to the outside of the casing 3 from the disk insertion/withdrawal hole 19, it is possible to prevent the optical disc 2 from being slipped off from the disk insertion/withdrawal hole 19 by self-weight.

Then, the base unit 40 for chucking the optical disk 2 to rotationally drine it, and for performing recording and/or reproduction of information signals will be explained.

Figure 15:
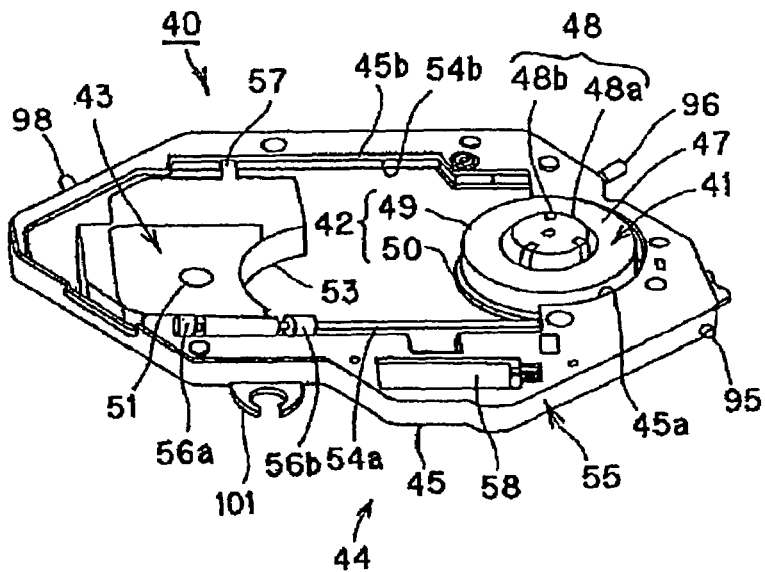
FIG. 15 is a perspective view showing the configuration of base unit.

As shown in FIG. 15, the base unit 40 is provided at the bottom surface portion of the bottom case 4, and includes a disk loading portion 41 adapted so that optical disk 2 which has been inserted into the casing 3 from the disk insertion/withdrawal hole 19 is loaded, a disk rotational drive mechanism 42 for rotationally driving the optical disk 2 which has been loaded at the disk loading portion 41, an optical pick-up 43 for performing write or read operation of signals with respect to the optical disk 2 rotationally driven by the disk rotation drive mechanism 44, and a pick-up feed mechanism 44 for performing feed operation of the optical pick-up 43 in the radial direction of the optical disk 2. Thus, the base unit 40 has the very thin type structure in which these components are provided integrally with the base 45.

As shown in FIG. 4, the base unit 40 is disposed at the front surface side relative to the chassis 11 so that the disk loading portion 41 is positioned at substantially the center on the bottom surface portion of the bottom case 4. Moreover, the base unit 40 is permitted to be vertically moved by base vertical movement mechanism 90 which will be described later. In the initial state where the optical disk 2 is not inserted, the base unit 40 is positioned at the lower direction relative to the carrying region of the optical disk 2 inserted from the disk insertion/withdrawal hole 19 into the casing 3. When the optical disk 2 is inserted, the base unit 40 is elevated by the base vertical movement mechanism 90 to load the optical disk 2 with respect to the disk loading portion 41 to rotationally drive it so that the optical pick-up 43 performs recording and/or reproduction of information signals. Then, in ejecting the optical disk 2, the base unit 40 is fallen by the base vertical movement mechanism 90 so that the optical disk 2 is detached from the disk loading portion 41 to permit the optical disk 2 to be carried by disk carrying mechanism 60 which will be described later.

The base 45 is formed by punching sheet metal so as to take a predetermined shape to slightly bend the periphery thereof toward lower direction. At the principal surface of the base 45, there are successively formed a substantially semicircular opening portion 45a for table which serves to face turn table 47 of disk loading unit 41 which will be described later toward upper direction, and a substantially rectangular opening portion 45b for pick-up which serves to face the object lens 51 of optical pick-up 43 which will be described later toward upper direction. In this example, decorative plates (not shown) where opening portions corresponding to these opening portions 45a, 45b are formed are attached to the upper surface portion of the base 45.

The disk loading unit 41 includes a turn table 47 rotationally driven by the disk rotation drive mechanism 42, wherein a chucking mechanism 48 for loading the optical disk 2 is provided at the central portion of the turn table 47. The chucking mechanism 48 includes an engagement projection 48a engaged with center hole 2a of the optical disk 2, and plural holding hooks 48b for holding the periphery of the center hole 2a of the optical disk 2 engaged with the engagement projection 48a, and serves to hold the optical disk 2 onto the turn table 47.

The disk rotation drive mechanism 42 includes a flat spindle motor 49 for rotationally driving the optical disk 2 in one body with the turn table 47, and the spindle motor 49 is attached, by screw-fitting, to the lower surface of the base 45 through a support plate 50 in such a manner that the turn table 47 provided on the upper surface portion is slightly projected from the opening portion 45a for table of the base 45.

The optical pick-up 43 includes an optical block for converging, by an object lens 51, light beams emitted from the semiconductor laser serving as light source to irradiate the light beams thus converged onto the signal recording surface of the optical disk 2 to detect, by a light detector comprised of light receiving element, etc., return light beams reflected on the signal recording surface of the optical disk 2, and serves to perform write or read operation of information signals with respect to the optical disk 2.

The optical pick-up 43 includes an object lens drive mechanism such as biaxial actuator, etc. for allowing the object lens 51 to undergo displacement drive in the optical axis direction (refrred to as focusing direction) and in a direction perpendicular to recording tracks of the optical disk (referred to as tracking direction), and is adapted to perform drive control such as focus servo for allowing the object lens 51 to be placed in in-focus state onto the signal recording surface of the optical disk 2 while allowing the object lens 51 to undergo displacement in the focusing direction and in the tracking direction by the biaxial actuator on the basis of a detection signal from the optical disk 2 detected by the above-described light detector, and tracking servo for allowing spot of light beams converged by the object lens 51 to follow recording tracks, etc. It is to be noted that there may be used, as the object lens drive mechanism, in addition to the focusing control and the tracking control which have been stated above, triaxial actuator for permitting adjustment of inclination (skew) of the object lens 51 with respect to the signal recording surface of the optical disk 2 in such a manner to irradiate light beams which have been converged by the object lens 51 in the state perpendicular to the signal recording surface of the optical disk 2.

The pick-up feed mechanism 44 includes a pick-up base 53 on which the optical pick-up 43 is mounted, a pair of guide shafts 54a, 54b for slidably supporting the pick-up base 53 in the radial direction of the optical disk 2, and a displacement drive mechanism 55 for performing displacement drive operation of the puck-up base 53 supported by these pair of guide shafts 54a, 54b in the radial direction of the optical disk 2.

At the pick-up base 53, there are formed, in a projected manner, from side surfaces opposite to each other, a pair of guide pieces 56a, 56b in which a guide hole inserted through one guide shaft 54a among a pair of guide shafts 54a, 54b is formed, and a guide piece 57 in which a guide groove with which the guide shaft 54b is held therebetween. Thus, the pick-up base 53 is slidably supported by a pair of guide shafts 54a, 54b.

The pair of guide shafts 54a, 54b are arranged so that they are caused to be in parallel to each other in the radial direction of the optical disk 2 at the lower surface of the base 45, and serves to guide the pick-up base 53 to which the optical pick-up 43 is faced from the pick-up opening portion 45b of the base 45 over the range inner and outer circumferences of the optical disk 2.

The displacement drive mechanism 55 transforms rotational drive of the drive motor 58 attached on the base 45 into linear drive through gear and/or rack (not shown) to allow the pick-up base 53 to undergo displacement drive in a direction along a pair of guide shafts 54a, 54b, i.e., in the radial direction of the optical disk 2.

The disk drive apparatus 1 comprises, as shown in FIG. 4, a disk carrying mechanism 60 for performing carrying operation of the optical disk 2 between a disk insertion/withdrawal position where the optical disk 2 is inserted into the disk insertion/withdrawal hole 19 and is withdrawn therefram and a disk loading position where the optical disk is loaded onto the turn table 47 of the disk loading portion 41. The disk carrying mechanism 60 includes a first rotational arm 61 and a second rotational arm 62 which can be fluctuated within plane surface in parallel to the principal surface of the optical disk 2 as support member caused to undergo movement operation between the principal surface opposite to disk loading portion 41 of the top plate portion 5a and the principal surface of the optical disk 2 which has been inserted from the disk insertion/withdrawal hole 19.

These first and second rotational arms 61 and 62 are respectively arranged at left and right both sides with which the disk loading portion 41 is held therebetween, wherein base end portions positioned at the rear (bac) face side relative to the disk loading portion 41 are rotatably supported, and front end portions positioned at the front face side relative to the disk loading portion 41 can be fluctuated in directions close to each other or apart from each other within plane surface in parallel to the principal surface of the optical disk 2 which has been inserted from the disk insertion/withdrawal hole 19.

In concrete terms, the first rotational arm 61 is comprised of elongated sheet metal, and is positioned at one side (e.g., right side in FIG. 4) of left and right sides with which the turn table 47 of the disk loading portion 41 is held therebetween, wherein the base end portion thereof is rotatably supported in directions indicated by arrow $a_1$, and arrow $a_2$ in FIG. 4 through a first support shaft 64 provided on the chassis 11. Moreover, at the front end portion of the first rotational arm 61, there is provided, in a projected manner, toward the lower direction, a first front face side contact member 65 caused to be in contact with the outer circumferential portion of the optical disk 2 which has been inserted from the disk insertion/withdrawal hole 19. Further, in the vicinity of the base end portion of the first rotational arm 61, there is provided, in a projected manner, toward the lower direction, a first rear surface side contact member 66 caused to be in contact with the outer circumferential portion of the optical disk 2 along with the first front surface side contact member 65 in allowing the optical disk 2 to undergo positioning at the disk loading position.

The first front face side contact member 65 and the first rear face side contact member 66 are formed by using synthetic resin softer than the optical disk 2, and have substantially drum shape in which the central portion caused to be in contact with the outer circumferential portion of the optical disk 2 which has been inserted from the disk insertion/withdrawal hole 19 is curved toward the inside and both end portions thereof serve to limit movement in a height direction of the optical disk 2 as diameter-enlarged flange portions 65a, 66a. The first front face side contact member 65 and the first rear face side contact member 66 may be roller having small diameter rotatably attached to the principal surface opposite to the disk loading portion 41 of the first rotational arm 61.

On the other hand, the second rotational arm 62 is comprised of elongated sheet metal, and is rotatbly supported in directions indicated by arrows $b_1$, and $b_2$ in FIG. 4 through the first support shaft 64 of which base end portion is provided on the chassis 11 in the state positioned at the other side (e.g., left side in FIG. 4) of left and right sides with which the turn table 47 of the disk loading portion 41 is held therebetween. Moreover, at the front end portion of the second rotational arm 62, a second front face side contact member 68 caused to be in contact with the outer circumferential portion of the optical disk 2 which has been inserted from the disk insertion/withdrawal hole 19 is provided in a projected manner toward the lower direction.

The second front face side contact member 68 is comprised of resin softer than the optical disk 2, and has substantially drum shape such that the central portion caused to be in contact with the outer circumferential portion of the optical disk 2 which has been inserted from the disk insertion/withdrawal hole 19 is curved toward the inside and the both end portions thereof serve to limit movement of the height direction of the optical disk 2 as diameter-enlarged flange portion 68a. Moreover, the second front face side contact member 68 may be roller having small diameter rotatably attached to the principal surface opposite to the disk loading portion 41 of the second rotational arm 62.

Further, at base end portions of the first and second rotational arms 61 and 62, there is provided a torsion coil spring 70 serving as biasing means for biasing these rotational arms 61, 62 in directions close to each other. The torsion coil spring 70 is adapted so that one end portion thereof is held at the base end portion of the first rotational arm 61 and the other end portion thereof is held at the base end portion of the second rotational arm 62 in the state where the first support shaft 64 is inserted through the winding portion thereof, whereby it biases the first and second rotational arms 61, 62 in directions close to each other. Moreover, the torsion coil spring 70 has biasing force sufficient to rotate the first and second rotational arms 61, 62 to all draw or pull plural kinds of optical disks 2 different in thickness and/or weight into the casing 3, or to eject these optical disks toward the outside of the casing 3.

As stated above, the first rotational arm 61 and the second rotational arm 62 are arranged at positions substantially symmetrical to each other with the turn table 47 of the disk loading portion 41 being held therebetween, and respective rotational centers are in correspondence with each other substantially at the central portion of the rear (back) side relative to the disk loading portion 41. Moreover, the front end portion of the first rotational arm 61 and the front end portion of the second rotational arm 62 are slidably supported along rotational direction in the state engaged with guide groove 9 of the above-described top plate portion 5a.

The disk carrying mechanism 60 includes an interlocking mechanism 71 for allowing these first and second rotation arms 61 and 62 to interlock with each other, and the first and second rotational arms 61 and 62 are permitted to be rotated in directions opposite to each other through the interlock mechanism 71. In concrete terms, the interlock mechanism 71 includes a first connection arm 72 and a second connection arm 73 which connect the first and second rotational arms 61 and 62. These first and second connection arms 72 and 73 are comprised of elongated sheet metal. The first and second connection arms 72 and 73 have the so-called pantograph structure in which respective one end portions in the length direction are rotatably supported by base end portion of the first rotational arm 61 and the base end portion of the second rotational arm 62, and respective the other end portions in the length direction are rotatably supported through a second support shaft 74. Moreover, the second support shaft 74 is engaged with guide groove 75 provided at the front surface side relative to the first support shaft 64 of the chassis 11, and the guide groove 75 is linearly formed over the range in the insertion direction of the optical disk 2.

Accordingly, the second support shaft 74 slides within the guide groove 75 so that the first and second rotational arms 61 and 62 are permitted to be rotated in directions opposite to each other through the first and second connection arms 72 and 73. Namely, the front end portion of the first rotational arm 61 and the front end portion of the second rotational arm 62 are permitted to be rotated in directions close to each other or away from each other by such an interlocking mechanism 71.

Moreover, the disk carrying mechanism 60 includes a third rotational arm 76 which is permitted to be fluctuated within plane surface in parallel to the principal surface of the optical disk 2 inserted from the disk insertion/withdrawal hole 19 as loading assist means for assisting loading operation for loading the optical disk 2 from the disk insertion/withdrawal hole 19 into the casing 3. The third rotational arm 76 is comprised of elongated sheet metal. The base end portion thereof is rotatably supported in directions indicated by arrows $c_1$ and $c_2$ through support shaft 77 provided on deck portion 4a in the state where the third rotation arm 76 is positioned at the front face side relative to the second rotational arm 62 of one side (e.g., left side in FIG. 4) of left and right sides with which the turn table 47 of the disk loading portion 41 is held therebetween. Moreover, at the front end portion of the third rotational arm 76, there is provided, in a projected manner, toward upper direction, a third contact member 78 caused to be in contac with the outer circumferential portion of the optical disk 2 which has been inserted from the disk insertion/withdrawal hole 19.

The third contact member 78 is a roller having small diameter rotationally attached to the principal surface opposite to the top plate portion 5a of the third rotational arm 76, and consists of resin softer than the optical disk 2. The third contact member 78 has substantially drum shape such that the central portion caused to be in contact with the outer circumferential portion of the optical disk 2 which has been inserted from the disk insertion/withdrawal hole 19 is curved toward the inside and the both end portions thereof serve to limit movement in the height direction of the optical disk 2 as flange portion 78a.

As the result of the fact that torsion coil spring (not shown) is held, such third rotational arm 76 is biased in a manner to have ability to perform switching between a direction where the third contact member 78 is caused to be in contact with the outer circumferential portion of the optical disk 2 and a direction where it is away from the outer circumferential portion of the optical disk 2.

Moreover, the disk carrying mechanism 60 includes a fourth rotational arm 79 which can be fluctuated within plane surface in parallel to the principal surface of the optical disk 2 inserted from the disk insertion/withdrawal hole 19 as eject assist means for assisting eject operation to eject the optical disk 2 from the disk insertion/withdrawal hole 19 toward the outside of the casing 3. The fourth rotational arm 79 is comprised of elongated sheet metal, and is rotatably supported in directions indicated by arrows $d_1$, and $d_2$ at the intermediate portion of the second rotational arm 62 of one side (e.g., left side in FIG. 4) of left and right sides with which the turn table 47 of the disk loading portion 41 is held therebetween. Moreover, at the front end portion of the fourth rotational arm 79, there is provided, in a projected manner, toward upper direction, a fourth contact member 80 caused to be in contact with the rear (back) side of the outer circumferential portion of the optical disk 2 which has been inserted from the disk insertion/withdrawal hole 19.

The fourth contact member 80 consists of resin softer than the optical disk 2, and has a substantially drum shape such that the central portion caused to be in contact with the outer circumferential portion of the optical disk 2 which has been inserted from the disk insertion/withdrawal hole 19 is curved, and the both end portions thereof serve to limit movement in the height direction of the optical disk 2 as diameter-enlarged flange portion 80a. Moreover, the fourth contact member 80 may be roller having small diameter rotationally attached to the principal surface opposite to the top plate portion 5a of the fourth rotational arm 79.

Further, at the second rotational arm 62, there is provided a limiting piece 81 for limiting rotation toward the rear (back) side of the fourth rotational arm 79 when the fourth rotational arm 79 is rotated toward the rear (back) face side, i.e., in a direction indicated by arrow $d_1$.

The disk carrying mechanism 60 includes a drive lever 82 for cooperating the above-described respective rotational arms 61, 62, 76, 79. The drive lever 82 is comprised of resin material in which the entirety is formed so as to take substantially parallelepiped shape, and is disposed between one side surface portion of the bottom case 4 and the base unit 40 at the bottom surface of the bottom case 4. Moreover, the drive lever 82 is positioned at lower side relative to the optical disk 2 inserted from the disk insertion/withdrawal hole 19 into the casing 3, wherein the upper surface portion thereof has height substantially in correspondence with that of the bottom surface portion of the deck portion 4a. The drive lever 82 is caused to undergo slide drive in forward and backward directions through displacement drive mechanism of which illustration is omitted composed of drive motor and/or group of gears, etc. which are provided on the bottom surface portion of the bottom case 4.

Further, at the disk carrying mechanism 60, the above-described support shaft 74 is slid within the guide group 75 in a manner interlocking with slide operation of the drive lever 82. Thus, the first and second rotational arms 61 and 62 are caused to undergo rotational operation in directions opposite to each other through interlocking mechanism 71. Moreover, at the base end side of the third rotational arm 76, there is provided a guide pin 84 engaged with a guide groove 83 provided at the upper surface of the drive lever 82. Thus, the guide pin 84 is slid within the guide groove 83 in a manner interlocking with slide operation of the drive lever 82 so that the third rotational arm 76 is caused to undergo rotational operation. Moreover, the fourth rotational arm 79 is caused to undergo rotational operation in a manner interlocking with slide operation of the drive lever 82 through connecting mechanism of which illustration is omitted.

In the disk carrying mechanism 60, these first, second, third and fourth rotational arms 61, 62, 76 and 79 perform, in a manner interlocking with each other, a loading operation to draw or pull the optical disk 2 from the disk insertion/withdrawal hole into the casing 3, a centering operation to allow the optical disk 2 to undergo positioning at disk loading position, and an eject operation to eject the optical disk 2 from the disk insertion/withdrawal hole 19 toward the outside of the casing 3.

The disk drive apparatus 1 comprises, as shown in FIG. 4, a base vertical movement mechanism 90 for allowing the base 45 which supports the optical pick-up 43 to undergo vertical movement operation in a manner interlocking with slide operation of the above-described drive lever 82.

The base vertical movement mechanism 90 allows the base 45 to undergo vertical movement operation between chucking position where the base 45 is elevated to load the optical disk 2 which has been caused to undergo positioning at the disk loading position by the disk carrying mechanism 60 with respect to the turn table 47 of the disk loading portion 41, chucking release position where the base 45 is fallen to detach the optical disk 2 from the turn table 47 of the disk loading portion 41, and intermediate position where the base 45 is positioned between the chucking position and the chucking release position to perform recording or reproduction of signals with respect to the optical disk 2.

In concrete terms, at the side surfaces opposite to the base 45 of the above-described drive lever 82, there are formed, over the range in the length direction, cam grooves (not shown) corresponding to the chucking position of the optical disk 2, the chucking release position of the optical disk 2 and the intermediate position therebetween.

Moreover, at the bottom surface portion of the bottom case 4, there is arranged a cam lever 91 along the side surface of the reat (back) face side of the base 45. The cam lever 91 is comprised of elongated flat plate member, and is caused to undergo slide operation in a direction substantially perpendicular to the slide direction of the drive lever 82 in a manner interlocking with slide operation in forward and backward directions of the drive lever 82. At the intermediate portion of the cam lever 91, there is provided a cam piece 92 bent from the end edge portion opposite to the base 45 toward upper direction. At the cam piece 92, there are formed, over the range in the length direction, cam slits (not shown) corresponding to the chucking position, the chucking release position and the intermediate position.

Further, at the bottom surface portion of the bottom case 4, a bent piece 93 is formed in bent manner along the side surface of the rear (back) side of the base 45. At the bent piece 93, there is formed vertical slit (not shown) for vertically moving the base 45 over the range in the upper and lower directions.

On the contrary, the base 45 includes, as shown in FIG. 15, a first support shaft 95 positioned at the disk loading portion 41 side of the side surface opposite to the drive lever 82 and engaged with cam slit of the drive lever 82 so that the first support 95 is supported, a second support shaft 96 positioned at the disk loading portion 41 side of the side surface opposite to the cam lever 91 and engaged with cam slit of the cam piece 92 and vertical slit of bent portion 93 so that the second support shaft 96 is supported, a third support shaft 98 positioned at the front face side of the side surface opposite to the side surface of the drive lever 82 so that the third support shaft 98 is rotatably supported at a shaft hole 97 provided at the side surface of the other side of the bottom case 4, and a fixed support portion 101 positioned at the front face side of the side surface opposite to the side surface opposite to the cam lever 91 and fixedly supported by screw 100 at the bottom surface portion of the bottom case 4 through an insulator 99 comprised of viscous elastic material such as rubber, etc.

Accordingly, at the base vertical movement mechanism 90, the first support shaft 95 is slid within cam slit of the drive lever 82 in a manner interlocking with slide operation of the drive lever 82 and the cam lever 91, and the second support shaft 96 is slid within cam slit of the cam lever 91 and vertical slit of bent piece 93, whereby the disk loading portion 41 slide of the base 45 is caused to undergo vertical movement operation between the chucking position of the optical disk 2, the chucking release position of the optical disk and the intermediate position therebetween with respect to the front face side.

Moreover, at the bottom face portion of the bottom case 4, as shown in FIG. 4, there is provided a push-up pin 102 serving as chucking release means for disengaging the optical disk 2 which has been loaded on the turn table 47 of the disk loading portion from the turn table 47 when the base vertical movement mechanism 90 falls the base 45. The push-up pin 102 is provided, in a projected manner, from the bottom surface portion of the bottom case 4 toward upper direction in the state positioned in the vicinity of the disk loading portion 41 of the base unit 40, in concrete terms, at the rear (back) side of the base 45 closest to the disk loading portion 41.

Figure 16:
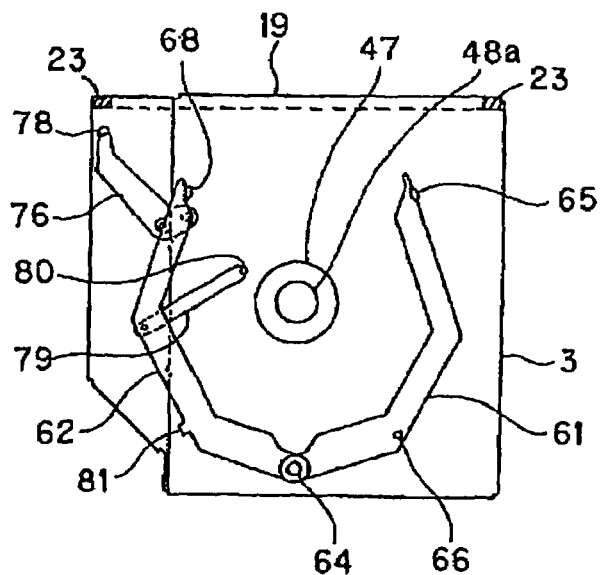
FIG. 16 is a view for explaining the operation of disk drive apparatus, and is a plan view showing the initial state.

Then, practical operation of the disk drive apparatus 1 constituted as described above will be explained. In the disk drive apparatus 1, as shown in FIG. 16, in the intial state before the optical disk 2 is inserted, the first and second rotational arms 61 and 62 are held in the state where respective front end portions thereof are opened at a predetermined broad angle. Moreover, the third rotational arm 76 is held in the state where the front end portion thereof is positioned at the outside relative to the base end portion, and the front end portion thereof is positioned at the front face side relative to the base end portion. Further, the fourth rotational arm 79 is held in the state where the front end portion thereof is positioned at the inside relative to the bottom end portion and the front end portion thereof is positioned at the front face side relative to the base portion. In addition, the drive lever 82 is positioned at the front face side of the bottom case 4.

Figure 17:
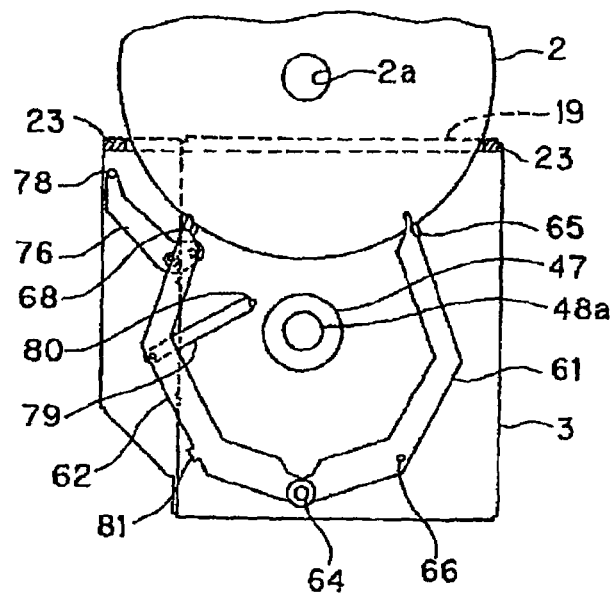
FIG. 17 is a view for explaining the operation of disk drive apparatus, and a plan view showing insertion start state of optical disk.

In the disk drive apparatus 1, even in the case where optical disks 2 different in thickness and/or weight are inserted from the disk insertion/withdrawal hole 19 of the casing 3, loading operation to draw or pull these optical disks 2 up to the disk attachment position is performed. In concrete terms, in the case where the optical disk 2 is inserted from the disk insertion/withdrawal hole 19 of the casing 3, there results the state where the rear (block) face side of the outer circumferential portion of the optical disk 2 which has been inserted from the disk insertion/withdrawal hole 19 into the casing 3 is first caused to be in contact with the first face side contact member 65 of the rotational arm 61 and the second front face side contact member 68 of the second rotational arm 62 as shown in FIG. 17.

In this case, when the optical disk 2 is inserted into the casing 3, load is applied the moment slide contact pieces 23 provided at both end portions 19a, 19b of the disk insertion/withdrawal hole 19 slidably comes into contact with outer circumferential portion 2A of the optical disk 2 in the state where the optical disk 2 is inserted into the casing to a degree of about one half, but insertion of the optical disk 2 is subsequently continued. Thus, the optical disk 2 is transferred to the disk carrying mechanism 60.

Figure 18:
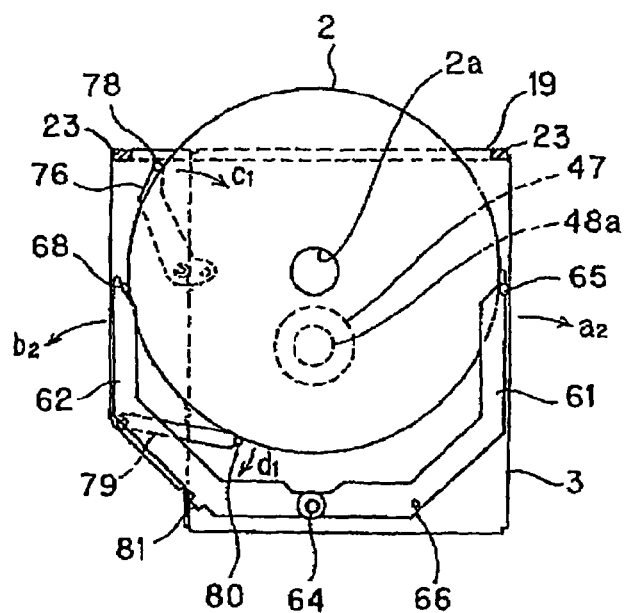
FIG. 18 is a view for explaining the operation of the disk drive apparatus, and is a plan view showing pull-in start state of optical disk.

Then, as shown in FIG. 18, when the optical disk 2 is further thrust or forced from the disk insertion/withdrawal hole 19 into the casing 3 from this state, the first rotational arm 61 and the second rotational arm 62 holds the outer circumferential portion of the optical disk 2 between the first front surface side contact member 65 and the second front face side contact member 68. At this time, in the state where the first front face side contact member 65 and the second front face side contact member 68 are caused to be in contact with the rear (back) side of the outer circumferential portion of the optical disk 2, the first rotational arm 61 and the second rotational arm 62 are rotated in directions apart from each other, i.e., directions indicated by arrows $a_2$, $b_2$ in FIG. 18 against biasing of the portion coil spring.

Further, when the first rotational arm 61 and the second rotational arm 62 are rotated by a predetermined quantity in directions apart from each other, detection switch provided on the circuit board is pressed down so that slide operation toward the rear (back) side of the drive lever 82 by the displacement drive mechanism is started. Thus, the third rotational arm 76 is rotated in the direction indicated by arrow $c_1$ in FIG. 18. Moreover, the third rotational arm 76 is placed in the state caused to be in contact with the front surface side of the outer circumferential portion of the optical disk 2 to thereby draw or pull the optical disk 2 into the casing 3 while pushing the front surface side of the outer circumferential portion of the optical disk 2.

Figure 19:
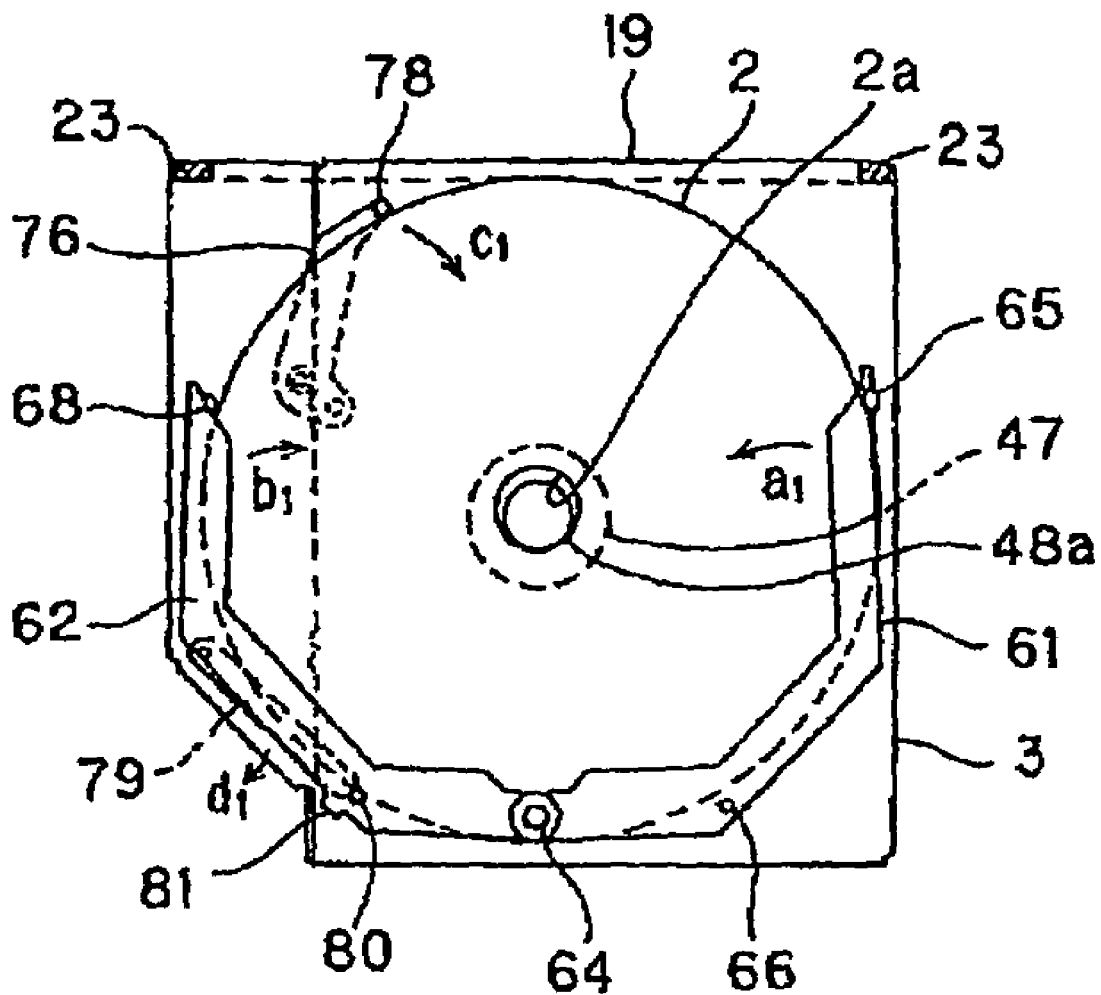
FIG. 19 is a view for explaining the operation of the disk drive apparatus, and is a plan view showing pull-in state at the time of pull-in operation of optical disk.

Further, as shown in FIG. 19, when the optical disk 2 is drawn or pulled into the casing 3 until the center hole 2a of the optical disk 2 is positioned at the rear (back) face side relative to linear line connecting the first front face side contact member 65 and the second front face side contact member 68, the first front face side contact member 65 and the second front face side contact member 68 are drawn in from the rear face side toward the front face side along the outer circumferential portion of the optical disk 2. Thus, in the state where the first front face side contact member 65 and the second front face side contact member 68 are, in turn, caused to be in contact with the front surface side of the outer circumferential portion of the optical disk 2, the first rotational arm 61 and the second rotational arm 62 are biased by torsion coil spring 70 so that they are rotated in directions close to each other, i.e., in directions indicated by arrows $a_1$, $b_1$. Thus, the first rotational arm 61 and the second rotational arm 62 draw or pull the optical disk 2 into the disk apparatus loading position shown in FIG. 20 while pressing the front surface side of the outer circumferential portion of the optical disk 2.

Moreover, the fourth rotational arm 79 is pressed down in the state where the fourth contact member 80 is caused to be in contact with the rear (back) surface side of the outer circumferential portion of the optical disk 2 so that it is rotated in a direction indicated by arrow $d_1$ in FIG. 19. Further, when the optical disk 2 has been drawn in at the disk loading position shown in FIG. 20, the fourth rotational arm 79 is caused to be in contact with limiting piece 81 of the second rotational arm 62 so that there results the state where rotation thereof has been limited.

Figure 20:
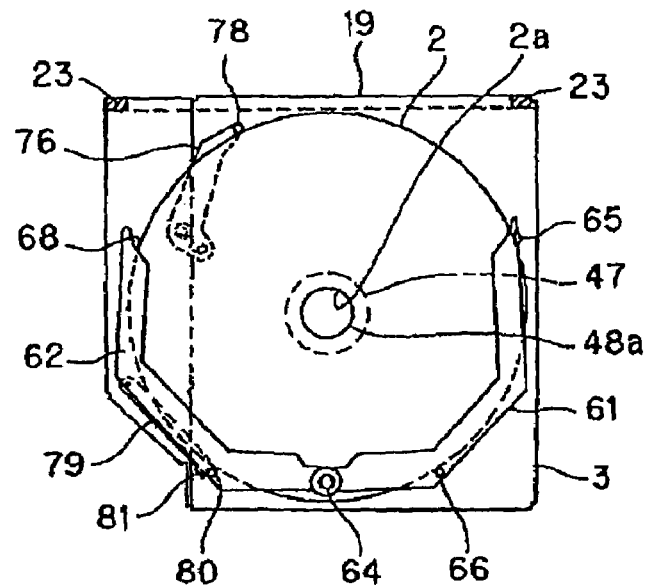
FIG. 20 is a view for explaining the operation of disk drive apparatus, and is a plan view showing centering state of the optical disk.

In the disk drive apparatus 1, as shown in FIG. 20, when the first and second rotational arms 61 and 62 have drawn or pulled various optical disks 2 different in thickness and/or weight up to the disk loading position, they perform centering operation to allow the optical disks 2 to be held between the insides of the first front face side contact member 65, the first rear (back) face side contact member 66, the second front face side contact member 68 and the fouth contact member 80 therebetween to allow these optical disks 2 to undergo positioning at the disk loading position. Namely, the center hole 2a of the optical disk 2 and engagement projection 48a of the turn table 47 are caused to be in correspondence with each other in a direction perpendicular to the principal surface of the optical disk 2.

Then, in the disk drive apparatus 1, after the centering operation of the above-described optical disk 2, the base vertical movement mechanism 90 elevates the base 45 to thereby perform a chucking operation for loading the optical disk 2 which has been caused to positioning at the disk loading position onto the turn table 47 of the disk loading portion 41.

Figure 21:
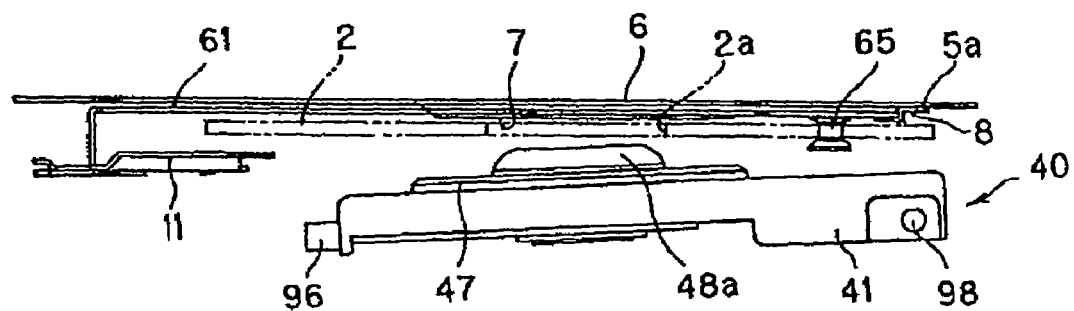
FIG. 21 is a view for explaining the operation of disk drive apparatus, and is a side view showing the state where base unit is located at chucking release position.
Figure 22:
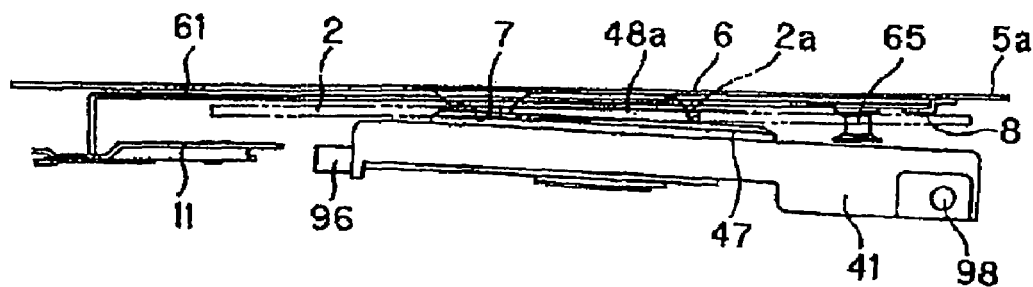
FIG. 22 is a view for explaining the operation of the disk drive apparatus, and is a side view showing the state where the base unit is located at chucking position.

In concrete terms, when the base 45 is elevated from the chucking release position shown in FIG. 21 up to the chucking position shown in FIG. 21 by base vertical movement mechanism 90, the periphery of the center hole 2a of the optical disk 2 is pressed onto the contact projection 7 of the top plate portion 5a while the engagement projection 48a is inserted into the central hole 2a of the optical disk 2 which has been caused to undergo positioning at the disk loading position so that the engagement projection 48a is engaged with the center hole 2a of the optical disk 2 and the optical disk 2 is held on the turn table 47 in the state where plural holding hooks 48b hold the periphery of the center hole 2a of the optical disk 2. Further, the base 45 is lowered down to the intermediate position shown in FIG. 23 by the base vertical movement mechanism 90 in the state where the optical disk 2 is held on the turn table 47.

Further, in the disk drive apparatus 1, after the above-described chucking operation, the first rotational arm 61 and the second rotational arm 62 are slightly rotated in directions apart from each other, i.e., in directions indicated by arrows $a_2$, $b_2$ in a manner interlocking with slide operation toward the rear (back) base side of the drive lever 82. At this time, the fourth rotational arm 79 is rotated in one body with the second rotational arm 62 in the state where it remains to be in contact with the limiting piece 81. Moreover, the third rotational arm 76 is slightly rotated in direction indicated by arrow $c_2$ in FIG. 24 in a manner interlocking with slide operation toward the rear (back) face side of the drive lever 82. Thus, there results the state where the first front face side contact member 65, the first rear surface side contact member 66, the second front face contact member 68, the third contact member 78 and the fourth contact member 80 are apart from the outer circumferential portion of the optical disk 2 which has been held on the turn table 47.

Figure 23:
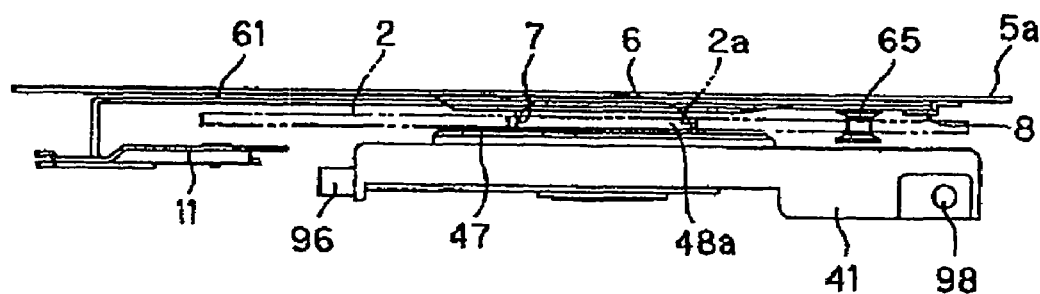
FIG. 23 is a view for explaining the operation of the disk drive apparatus, and is a side view showing the state where the base unit is located at intermediate position.
Figure 24:
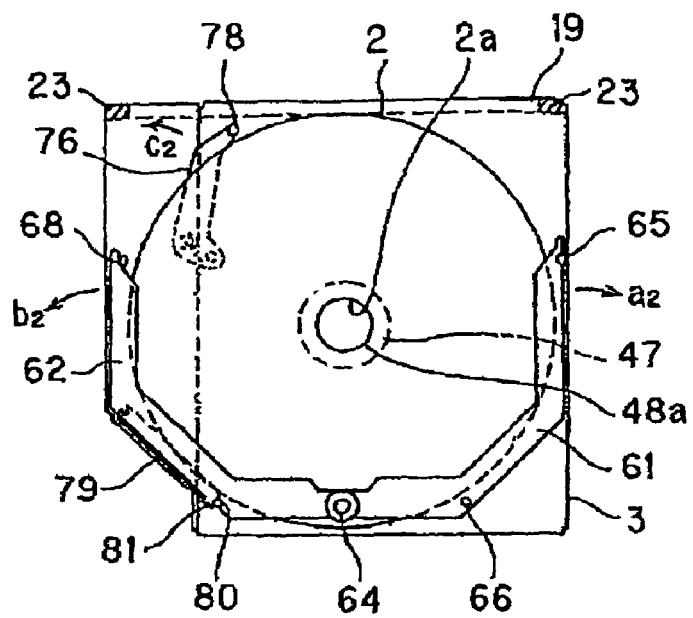
FIG. 24 is a view for explaining the operation of the disk drive apparatus, and is a plan view showing chucking state of the optical disk.

In the disk drive apparatus 1, when command of recording or reproduction is sent from a personal computer 1000 from the state shown in FIGS. 23 and 24, recording or reproduction of information signals is performed with respect to the optical disk 2 on the basis of the command. In concrete terms, the spindle motor 49 rotationally drives the optical disk 2 in one body with the turn table 47, and the optical pick-up 43 is moved from the outer circumferential side toward inner circumferential side by the pick-up feed mechanism 44. When the focus servo control and the tracking servo control are applied, read-out operation of TOC data recorded within the lead-in region of the optical disk 2 is performed. Thereafter, in the case where information signals are recorded, the optical pick-up 43 is moved to a predetermined address within program region of the optical disk 2 on the basis of TOC data which has been read out. Moreover, at the time of reproduction of information signals, the optical pick-up 43 is moved to address within the program region where designated data are recorded. Further, the optical pick-up 43 performs write or read operation of information signals with respect to a desired recording track of the optical disk 2.

In the disk drive apparatus 1, when eject button 21 provided at the front panel 18 is pushed down, or eject command is sent from the personal computer 1000 to the disk drive apparatus 1, slide operation toward the front face side of the drive lever 82 by the displacement drive mechanism is first started on the basis of the command.

Figure 25:
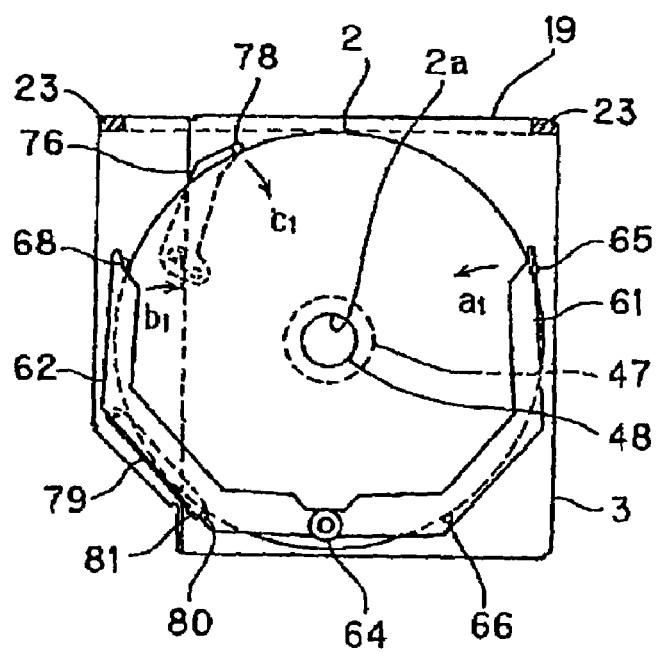
FIG. 25 is a view for explaining the operation of the disk drive apparatus, and is a plan view showing chucking release state of the optical disk.

Further, as shown in FIG. 25, the first rotational arm 61 and the second rotational arm 62 are slightly rotated in directions close to each other, i.e., in directions indicated by arrows $a_1$ and $b_1$ in FIG. 25 in a manner interlocking with slide operation toward the front surface side of the drive lever 82. At this time, the fourth rotational arm 79 is rotated in one body with the second rotational arm 62 in the state where it remains to be in contact with the limiting piece 81. Moreover, the third rotational arm 76 is slightly rotated in the direction indicated by arrow $c_1$ in FIG. 25 in a manner interlocking with slide operation toward the front face side of the drive lever 82.

Thus, there results the state where the first front face side contact member 65, the first rear (back) face contact member 66, the second front face side contact member 68, the third contact member 78 and the fourth contact member 80 are in contact with the outer circumferential portion of the optical disk 2 held at the turn table 47.

Then, in the disk drive apparatus 1, the base vertical movement mechanism 90 falls the base 45 down to the chucking release position to thereby perform chucking release operation to detach the optical disk 2 from the turn table 47 of the disk loading portion 41. In concrete terms, when the base 45 is fallen down to the chucking release position, the front end portion of the push-up pin 102 comes into contact with non-signal recording region of the inner circumferential side of the optical disk 2 loaded at the turn table 47 of the disk loading portion 41 to thereby release engagement between center hole 2a of the optical disk 2 and holding hook 48b of the engagement projection 48a while pushing up the optical disk 2 to detach the optical disk 2 from onto the turn table 47.

Figure 26:
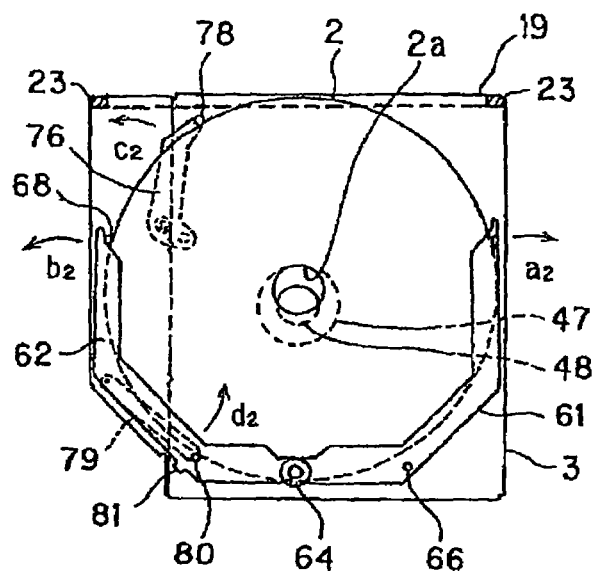
FIG. 26 is a view for explaining the operaion of the disk drive apparatus, and is a plan view showing eject start state of the optical disk.

Then, in the disk drive apparatus 1, eject operation to eject the optical disk 2 located at the disk loading portion 41 from the disk insertion/withdrawal hole 19 toward the outside of the casing 3 is performed. In concrete terms, in the case where large diameter disk 2A is ejected from the disk insertion/withdrawal hole 19 of the casing 3, the fourth rotational arm 79 is first rotated, as shown in FIG. 26, in the direction indicated by arrow $d_2$ in FIG. 26 in a manner interlocking with slide operation toward the front surface side of the drive lever 82. Moreover, the fourth contact member 80 is placed in the state caused to be in contact with the back surface side of the outer circumferential portion of the optical disk 2, whereby the fourth rotational arm 79 pushes out the optical disk 2 toward the outside of the casing 3 while pressing the rear (back) side of the outer circumferential portion of the optical disk 2.

Figure 27:
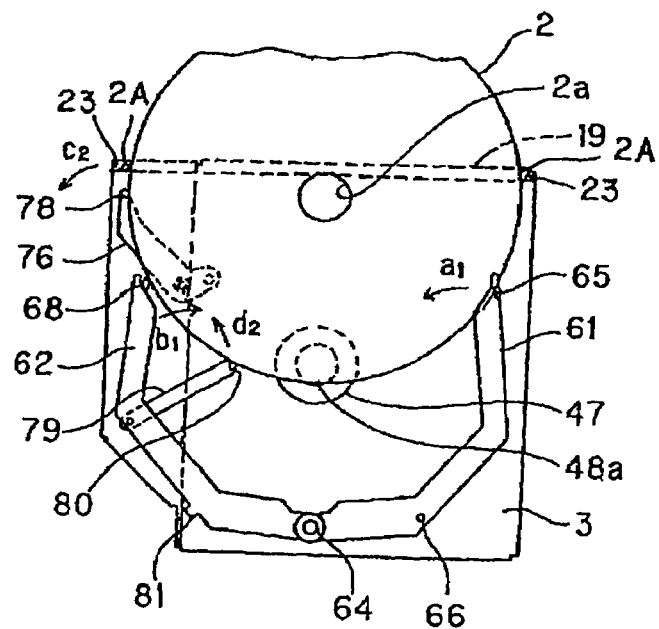
FIG. 27 is a view for explaining the operation of the disk drive apparatus, and is a plan view showing push-out state at the time of eject operation of optical disk.

Further, when the optical disk 2 is ejected toward the outside of the casing 3, as shown in FIG. 27, until the center hole 2a of the optical disk 2 is positioned at the front surface side relative to linear line connecting the first front face side contact member 65 and the second front face side contact member 68, the first front face side contact member 65 and the second front face side contact member 68 draw in from the front surface side toward the rear (back) side along the outer circumferential portion of the optical disk 2. Thus, in the state where the first front face side contact member 65 and the second front face side contact member 68 are caused to be in contact with the rear (back) side of the outer circumferential portion of the optical disk 2, the first rotational arm 61 and the second rotational arm 62 are biased by torsion coil 70 so that they are rotated in turn in directions close to each other, i.e., in directions indicated by arrows $a_1$ and $b_1$. Thus, the first rotational arm 61 and the second rotational arm 62 push out the optical disk 2, while pushing the rear (back) face side of the outer circumferential portion of the optical disk 2, up to the disk insertion/withdrawal position shown in FIG. 28, i.e., the position where the center hole 2a of the optical disk 2 is exposed from the disk insertion/withdrawal hole 19 toward the outside of the casing 3.

Figure 28:
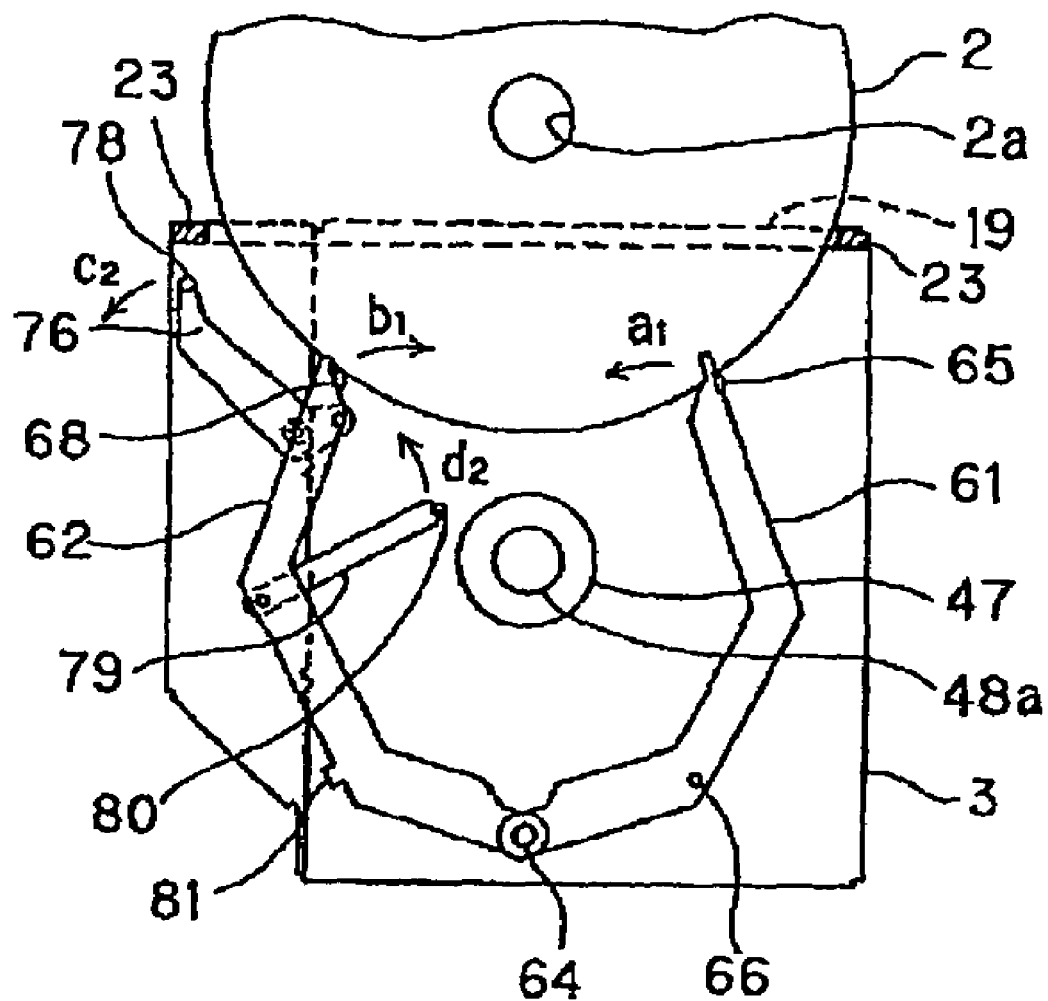
FIG. 28 is a view for explaining the operation of the disk drive apparatus, and is a plan view showing eject state of optical disk.

When the optical disk 2 is pushed out to the disk insertion/withdrawal position shown in FIG. 28, slide contact pieces 23 provided at both end portions 19a, 19b of the disk insertion/withdrawal hole 19 apply load on the optical disk pushed out by first and second rotational arms 61, 62 of the disk carrying mechanism 60 to thereby optimize projection quantity of the optical disk 2. Namely, when the optical disk 2 is projected to a degree of about one half, the slide contact pieces 23 slidably come into contact with the outer circumferential portion 2A of the optical disk 2 to give or apply load thereto. From this fact, it is possible to stop the optical disk 2 at the disk projection position where the center hole 2a of the optical disk 2 shown in FIG. 28 is faced toward the outside from the disk insertion/withdrawal hole 19. Thus, user grasps, by fingers, the portion between the center hole 2a and the outer circumferential portion of the optical disk 2 faced to the outside from the disk insertion/withdrawal hole 19, thus making it possible to easily perform taking-out operation of the optical disk 2.

Here, as described above, the first and second rotational arms 61, 62 are rotated and biased in directions close to each other by biasing force of the torsion coil spring 70 to thereby push out the optical disk 2 toward the outside of the casing 3. Accordingly, since unevenness takes place in thickness and/or weight of the disk depending upon kind of optical disk, also in the case where any optical disk 2 is used among plural kinds of optical disks only by biasing force by the torsion coil spring 70, it is difficult to eject the optical disk 2 to a predetermined disk eject position. However, in the disk drive apparatus 1 to which the present invention is applied, since slide contact pieces 23 are provided at both end portions of the disk insertion/withdrawal hole 19, the optical disk 2 is pushed out by first and second rotational arms 61, 62 which have been caused to undergo biasing force by torsion coil spring y0 until the optical disk 2 is ejected from the disk insertion/withdrawal hole 19 to a degree of about one half. When the optical disk 2 is ejected from the disk insertion/withdrawal hole 19 to a degree of about one half, the slide contact piece 23 slidably comes into contact with the outer circumferential portion 2A of the optical disk 2 at this timing to apply load thereto. Thus, also in the case where various optical disks 2 different in thickness and/or weight are used, even if any optical disk is used, it is possible to stop eject operation of the optical disk 2 at the disk insertion/withdrawal position shown in FIG. 28, i.e., the position where the center hole 2a of the optical disk 2 is exposed to the outside of the casing 3 from the disk insertion/withdrawal hole 19.

Moreover, in the case where panel curtain 30 is provided at the front panel 18, the lower edge portion 30a or upper and lower edge portions 30a, 30b of the panel curtain 30 slidably comes into contact with the upper side principal surface portion 2B or upper and lower slide principal surface portions 2B, 2C of the optical disk 2 to thereby give or apply load to eject output by the disk carrying mechanism 60. Thus, in the disk drive apparatus 1, in the case where various optical disks 2 different in weight and/or width are used, it is possible to prevent jumping-out from the disk insertion/withdrawal hole 19 of the optical disk 2 also when eject output by the disk carrying mechanism 60 is large with respect to the optical disk 2.

In this example, the third rotational arm 76 is pressed in the state where the third contact member 78 is caused to be in contact with the outer circumferential portion of the optical disk 2 so that it is rotated in a direction indicated by arrow $c_2$ in FIG. 27.

Figure 29:
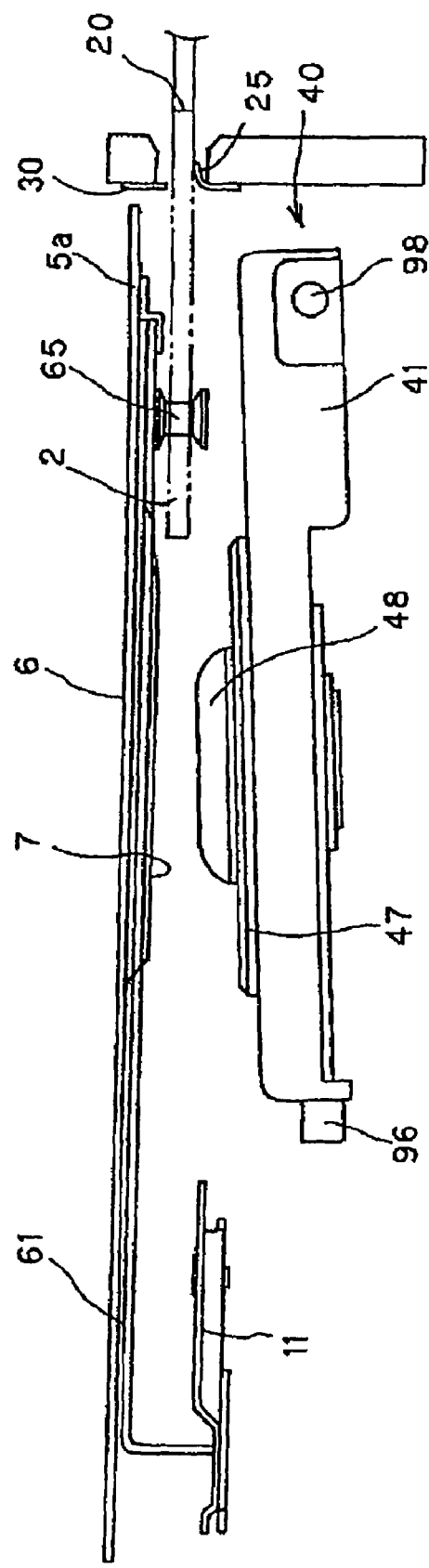
FIG. 29 is a side view showing the state where slide contact piece of the panel curtain is slidably in contact with the principal surface of the disk at the time of eject operation of optical disk to thereby eject the optical disk toward optimum eject position.

The state where eject operation of the optical disk 2 is performed in the above-described examples shown in FIGS. 11 to 14 will be explained with reference to FIGS. 29 and 30.

As described above, respective optical disks 2 which have been pushed out up to the disk insertion/withdrawal position by the first and second rotational arms 61 and 62 are ejected from the disk insertion/withdrawal hole 19 of the front panel 18 toward the outside of the casing 3. At this time, at the disk drive apparatus 1, as shown in FIG. 29, the slide contact portion 25 of the panel curtain 30 formed at the front panel 18 is caused to be slidably in contact with the optical disk 2. Since the slide contact portion 25 is formed at the center in the length direction of the panel curtain 30 in correspondence with the non-recording region such as offset portion 33, etc. formed at the periphery of the central hole 2a of the optical disk 2, when the optical disk 2 is ejected from the disk insertion/withdrawal hole 19, the optical disk 2 slidably comes into contact with the offset portion 33 in a manner to ride thereon. Accordingly, eject output by the first and second rotational arms 61, 62 which have been rotationally biased with respect to the torsion coil spring 70 is suppressed by slide contact friction of the slide contact portion 5, so the optical disk 2 is ejected up to the position where the central hole 2a is faced toward the outside from the disk insertion/withdrawal hole 19 as shown in FIG. 2. Thus, user can grasp the center hole 2a and the disk outer circumferential portion of the optical disk 2 faced from the disk insertion/withdrawal hole 19, and can easily take out the optical disk 2 from the disk drive apparatus 1 without touching the recording region.

As stated above, at the disk drive apparatus 1, also in the case where optical disks 2 different in diameter and/or thickness are ehjected by using the first and second rotational arms 61, 62, the slide contact portion 25 is caused to be slidably contact therewith to thereby suppress eject output applied to the optical disk, thus making it possible to eject respective optical disks 2 to optimum positions corresponding thereto.

Figure 30:
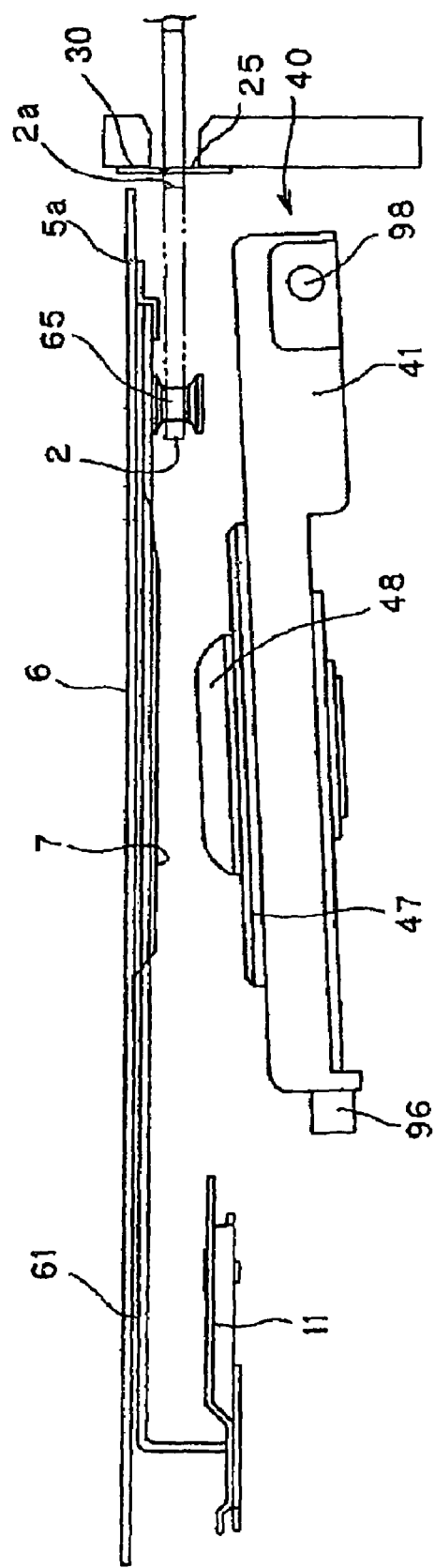
FIG. 30 is a side view showing the state where slide contact piece of panel curtain is held at center hole of the disk at the time of ejecting the optical disk to thereby eject the optical disk to optimum eject position.

Moreover, in the case where the slide contact portion 25 is formed in accordance with the center hole 2a of the optical disk 2, the slide contact portion 25 is held at the center hole 2a while slidably coming into contact with one surface of the optical disk 2 as shown in FIG. 30. Accordingly, at the disk drive apparatus 1, also in the case where eject output by rotation of the first and second rotational arms 61, 62 is large as compared to diameter and/or thickness, etc. of the optical disk 2, the slide contact portion 25 is held at the center hole 2a to thereby prevent jumping-out from the disk insertion/withdrawal hole 19. Moreover, there can result optimum eject quantity in which the center hole 2a is stopped at the position faced from the disk insertion/withdrawal hole 19.

The present invention is not limited to equipment applied to slot-in type disk drive apparatus 1 mounted within the above-described note type personal computer 1000, but can be widely applied to disk drive apparatuses and/or game machines for home and/or mounted for vehicle which are adapted for performing recording and/or reproduction of information signals with respect to optical disks.

It is to be noted that while the present invention has been described in accordance with preferred embodiments thereof in the accompanying drawings and described in detail, it should be understood by those ordinarily skilled in the art that the invention is not limited to embodiments, but various modifications, alternative constructions or equivalents can be implemented without departing from the scope and spirit of the present invention as set forth by appended claims.

The invention claimed is:

1. A disk drive apparatus comprising:
    a casing comprising a front panel in which a substantially rectangular disk insertion/withdrawal portion is provided;
    a disk carrying mechanism comprising a plurality of rotational arms to hold the outer circumference of an optical disk therebetween and a biasing member to bias the plurality of rotational arms in a predetermined direction in accordance with a carrying position of the optical disk, the disk carrying mechanism carrying the optical disk between a disk insertion/withdrawal position, where the optical disk undergoes an insertion/withdrawal operation with respect to the disk insertion/withdrawal hole of the front panel, and a disk loading position, where the optical disk which has been inserted into the casing is loaded;
    a disk loading portion to which the optical disk which has been carried within the casing is loaded;
    a disk rotation drive mechanism to rotationally drive the optical disk which has been loaded at the disk loading portion;
    an optical pick-up to perform recording and/or reproduction of information signals with respect to the optical disk rotationally driven by the disk rotation drive mechanism; and
    a pick-up feed mechanism to allow the optical pick-up to undergo feed operation in a radial direction of the optical disk,
    wherein a slide contact piece caused to be slidably in contact with the optical disk is provided at the disk insertion/withdrawal hole to thereby limit projection quantity of the optical disk,
    wherein the slide contact piece being provided at both end portions in a length direction respectively and are adapted to be slidably in contact with the outer circumferential surface of the optical disk; wherein these two slide contact pieces have friction coefficients different from the optical disk.

2. The disk drive apparatus as set forth in claim 1,
    wherein the slide contact piece is comprised of a panel curtain adapted for covering a portion or the entirety of a length direction of the disk insertion/withdrawal hole to slidably in contact with the principal surface of the optical disk ejected toward the outside of the casing.

3. A disk drive apparatus comprising:
    a casing comprising a front panel in which a disk insertion/withdrawal hole adapted so that an optical disk is inserted thereinto and is drawn therefrom is provided;
    a base unit comprising a disk loading portion adapted so that the optical disk which has been inserted from the disk insertion/withdrawal hole of the front panel into the casing is loaded, a disk rotation drive mechanism to rotationally drive the optical disk which has been loaded at the disk loading portion, an optical pick-up to perform write and/or read operations of signals with respect to the optical disk rotationally driven by the disk rotation drive mechanism, and a pick-up feed mechanism to allow the optical pick-up to undergo feed operation in a radial direction of the optical disk, wherein the disk loading portion, the disk rotational drive mechanism, the optical pick-up and the pick-up feed mechanism are integrally provided on a base;
    a disk carrying mechanism comprising a plurality of rotational arms to hold the outer circumference of the optical disk therebetween, and biasing means to bias the plurality of rotational aims in a predetermined direction in accordance with a carrying position of the optical disk, and the disk carrying mechanism carrying optical disks different in an outer diameter between a disk insertion/withdrawal position, where the optical disk is inserted into the disk insertion/withdrawal hole of the front panel and is drawn therefrom, and a disk loading position, where the optical disk is loaded into the disk loading portion; and
    a panel curtain permitted to be inclined in an insertion/withdrawal direction of the optical disk, which is provided at the rear face of the front panel;
    wherein the panel curtain includes a first panel curtain caused to be slidably in contact with the principal surface portion of the top face side of the optical disk, and a second panel curtain caused to be slidably in contact with the principal surface portion of the bottom face side of the optical disk,
    wherein a first thickness of the first panel curtain and a second thickness of the second panel curtain are different from each other.

4. The disk drive apparatus as set forth in claim 3,
    wherein a slide contact piece caused to be slidably in contact with the optical disk is provided at the panel curtain.

5. The disk drive apparatus as set forth in claim 4,
    wherein the slide contact piece is provided in correspondence with a clamp region where the optical disk is loaded.

6. The disk drive apparatus as set forth in claim 4,
    wherein the slide contact piece is provided in correspondence with the diameter of a hole provided at the center of the optical disk.

7. The disk drive apparatus as set forth in claim 3,
    wherein the slide contact piece is provided in correspondence with a region surrounded by a projection provided so as to take circular shape substantially at the center of the optical disk.

8. The disk drive apparatus as set forth in claim 3,
    wherein the panel curtain includes a first panel curtain caused to be slidably in contact with the principal surface portion of the top face side of the optical disk, and a second panel curtain caused to be slidably in contact with the principal surface portion of the bottom face side of the optical disk,
    wherein a first length in a length direction of the first panel curtain and a second length in the length direction of the second panel curtain are different from each other.

9. The disk drive apparatus as set forth in claim 3,
    wherein the panel curtain includes a first panel curtain caused to be slidably in contact with the principal surface portion of the top face side of the optical disk, and a second panel curtain caused to be slidably in contact with the principal surface portion of the bottom face side of the optical disk,
wherein a first length in upper and lower directions of the disk insertion/withdrawal hole of the first panel curtain and a second length in the upper and lower directions of the disk insertion/withdrawal hole of the second panel curtain are different from each other.

* * * * *